US009679417B1

(12) United States Patent
Ross

(10) Patent No.: US 9,679,417 B1
(45) Date of Patent: Jun. 13, 2017

(54) SYSTEM AND METHOD FOR PRESENTING VIRTUAL REALITY CONTENT TO A USER

(71) Applicant: VISIONARY VR, INC, Los Angeles, CA (US)

(72) Inventor: Jonathan Michael Ross, Santa Monica, CA (US)

(73) Assignee: Visionary VR, Inc., Los Angeles, CA (US)

( * ) Notice: Subject to any disclaimer, the term of this patent is extended or adjusted under 35 U.S.C. 154(b) by 0 days.

(21) Appl. No.: 15/094,962

(22) Filed: Apr. 8, 2016

Related U.S. Application Data

(63) Continuation of application No. 14/489,128, filed on Sep. 17, 2014, now Pat. No. 9,392,212.

(60) Provisional application No. 61/980,658, filed on Apr. 17, 2014.

(51) Int. Cl.
| | |
|---|---|
| H04N 9/47 | (2006.01) |
| G06T 19/00 | (2011.01) |
| G06T 19/20 | (2011.01) |
| G06F 3/01 | (2006.01) |
| H04N 9/87 | (2006.01) |
| G11B 27/00 | (2006.01) |
| G11B 31/00 | (2006.01) |
| G02B 27/01 | (2006.01) |

(52) U.S. Cl.
CPC .......... *G06T 19/006* (2013.01); *G02B 27/017* (2013.01); *G06F 3/011* (2013.01); *G06T 19/20* (2013.01); *G11B 27/005* (2013.01); *G11B 31/006* (2013.01); *H04N 9/8715* (2013.01)

(58) Field of Classification Search
CPC .................................................... H04N 5/7491

USPC .............................. 348/51, 53; 345/158, 633
See application file for complete search history.

(56) References Cited

U.S. PATENT DOCUMENTS

| | | | |
|---|---|---|---|
| 2009/0256904 A1 | 10/2009 | Krill | |
| 2011/0102552 A1* | 5/2011 | Diehl | ........................ B60R 1/00 348/47 |
| 2011/0320116 A1 | 12/2011 | DeMaio | |
| 2012/0127169 A1 | 5/2012 | Barcay | |

(Continued)

OTHER PUBLICATIONS

Shubber, Kadhim, "Are you ready for the virtual reality revolution?" The Guardian, Aug. 2, 2014, 5 pgs.

*Primary Examiner* — Thai Tran
*Assistant Examiner* — Mishawn Hunter
(74) *Attorney, Agent, or Firm* — Sheppard Mullin Richter & Hampton LLP

(57) ABSTRACT

This disclosure describes a system configured to present primary and secondary, tertiary, etc., virtual reality content to a user. Primary virtual reality content may be displayed to a user, and, responsive to the user turning his view away from the primary virtual reality content, a sensory cue is provided to the user that indicates to the user that his view is no longer directed toward the primary virtual reality content, and secondary, tertiary, etc., virtual reality content may be displayed to the user. Primary virtual reality content may resume when the user returns his view to the primary virtual reality content. Primary virtual reality content may be adjusted based on a user's interaction with the secondary, tertiary, etc., virtual reality content. Secondary, tertiary, etc., virtual reality content may be adjusted based on a user's progression through the primary virtual reality content, or interaction with the primary virtual reality content.

26 Claims, 9 Drawing Sheets

(56) References Cited

U.S. PATENT DOCUMENTS

| | | |
|---|---|---|
| 2012/0133884 A1 | 5/2012 | Ishida |
| 2012/0212414 A1 | 8/2012 | Osterhout |
| 2012/0299920 A1 | 11/2012 | Coombe |
| 2013/0050260 A1 | 2/2013 | Reitan |
| 2013/0336629 A1 | 12/2013 | Mulholland |
| 2013/0342525 A1 | 12/2013 | Benko |
| 2014/0002443 A1* | 1/2014 | Cunningham ........ G06T 19/006 345/419 |
| 2014/0009476 A1 | 1/2014 | Venkitaraman |
| 2014/0361956 A1 | 12/2014 | Mikhailov |
| 2015/0094142 A1 | 4/2015 | Stafford |
| 2016/0018655 A1 | 1/2016 | Imoto |
| 2016/0027212 A1 | 1/2016 | da Veiga |
| 2016/0054565 A1 | 2/2016 | Izumihara |

\* cited by examiner

SYSTEM AND METHOD FOR PRESENTING VIRTUAL REALITY CONTENT TO A USER

FIELD OF THE DISCLOSURE

This disclosure relates to a system and method for presenting virtual reality content to a user. The system and method may be configured such that the virtual reality content is user configurable.

BACKGROUND

Virtual reality headset display devices are known. These devices visually simulate a user's physical presence in virtual spaces. Simulations typically include a 360° view of the user's surrounding virtual space such that user may turn his head to view different portions of the surrounding space. Activity in the virtual space continues to progress regardless of which direction the user is facing and the user does not receive any indication of his view direction.

Virtual reality presents a problem for storytellers. How does a storyteller maintain the attention of an audience member so he can be told a story if he can look wherever he wants and go wherever he wants in the virtual space? (Note that the term "he" is used generically throughout the application to indicate both male and female.) In traditional forms of storytelling there is typically a content narrative presented within the boundaries of a view screen. In a virtual space, there is a continuum. The audience member may simply wander and/or look away during a story, thus breaking a rhythm, pacing, and style of the narrative, and/or the narrative all together, thus disrupting the intended flow of a story, information, emotion, etc., to the user, as intended by the storyteller. Storytellers have therefore resorted to gimmicks and tricks to re-direct the attention of the audience member (e.g., loud noises and/or characters telling and/or showing the audience member where to look), which does not allow for more engaged and/or focused storytelling, and becomes progressively more problematic and transparent, the longer the story.

SUMMARY

The present system uses boundaries to divide a virtual space into areas where primary content, secondary content, tertiary content, etc. may be presented to the user. These boundaries may be indicated to a user (e.g., an audience member) via sensory cues so that the user understands what is considered on stage (e.g. primary content) and off stage (secondary, tertiary, etc. content), for example. In some implementations, the boundaries may indicate areas in which a passive narrative content experience is taking place versus areas where interactive content experiences may be available. This may facilitate maintaining a user's attention while narrative content and/or other content is presented to the user in the virtual space.

As such, one or more aspects of the disclosure relate to a system configured to present virtual reality content to a user. The system may include software components, hardware components, and/or other components operating together to cause the system to function as described herein. The system may be configured such that the virtual reality content is user configurable. For example, the system may enable a content creator, a storyteller, a filmmaker, a game maker, a game creator, and/or other content creators to maintain an audience member's (e.g., a user's) attention in virtual reality by determining how to deliver content (described below) to the audience member and enable the audience member to adjust their experience within parameters allowed by the creator. The virtual reality content may be presented to the user in a virtual space. The virtual reality content may include primary virtual reality content, secondary virtual reality content, tertiary virtual reality content (etc.), and/or other virtual reality content.

As used herein, "virtual reality" may refer to what is traditionally considered virtual reality as well as augmented reality and/or other similar concepts. In some implementations, "virtual reality" may refer to a form of virtual reality/augmented reality hybrid and/or include an aspect and/or ability to view content in an augmented reality way. For example, creators may generate traditional virtual reality content but use augmented reality cameras to keep the user's peripheral vision open so they can keep an eye on the physical world around them.

The terms "primary virtual reality content" and "secondary virtual reality content" used herein are not intended to be limiting. The system may include any number of different types of virtual reality content. "Primary" and "secondary" may be used generically throughout this disclosure to represent various different types of virtual reality content. The functionality described herein may be applied to any number of different types (e.g., primary, secondary, tertiary, etc.) of virtual reality content. In some implementations, secondary virtual content may refer to any virtual reality content that is not primary virtual reality content (e.g., secondary virtual reality content may include several different types of virtual reality content). In some implementations, the term virtual reality may include virtual reality as described herein, augmented reality, mixed reality and/or other forms of virtual reality.

The system may be configured such that primary virtual reality content may be displayed to a user, and, responsive to the user turning his view away from the primary virtual reality content; moving away from the primary virtual reality content; and/or taking other actions; one or more sensory cues may be provided to the user that indicate to the user that his view is no longer directed toward the primary virtual reality content. At such times the primary virtual reality content may be paused and secondary, tertiary, etc., virtual reality content may be displayed to the user. For example, the system may be configured to determine that a view direction of the user has moved across a field boundary between a first field of view (where the primary virtual reality content is displayed) and a second field of view (e.g., where the secondary virtual reality content is displayed). The view direction of the user may refer to a direction toward which the user's gaze is directed, an orientation of the user's gaze (e.g., the user may tilt his head and/or lean over), a position of the user within the virtual space, and/or other directional and/or positional information (e.g., a user may move his position in the virtual space across a boundary). The primary virtual reality content may resume (e.g., automatically) when the user returns his view (e.g., and/or moves within the virtual space) to the primary virtual reality content first field of view. The primary virtual reality content subsequently displayed to the user may be adjusted based on a user's interaction with the secondary, tertiary, etc., virtual reality content and/or other information. These features are not limited to the primary virtual reality content. For example, the system may be configured such that secondary, tertiary, etc., virtual reality content may pause when the user looks and/or moves away and then resume when the user returns. The secondary, tertiary, etc., virtual reality content may be adjusted based on a user's progression through the other (e.g., primary) virtual reality content, interaction with the other (e.g., primary) virtual reality content, and/or other information.

In some implementations, the system may be configured such that a user may create, customize, and/or adjust the virtual reality content, the fields of view, view boundaries, and/or other characteristics of the system. The system may be configured such that a user may set and/or adjust, and/or the system may be configured to automatically adjust the fields of view, the field boundaries, relationships between the primary virtual reality content and the secondary, tertiary, etc. virtual reality content, types of interactions between the user and the primary virtual reality content and/or between the user and secondary, tertiary, etc., virtual reality content, and/or other content creation and/or adjustment activities. In some implementations, the system may be configured such that the creating, customizing, and/or adjusting enhances a user's physical comfort while viewing the virtual reality content. In some implementations, the system may be configured such that a user may create, customize, and/or adjust within previously determined parameters for creating, customizing, and/or adjusting (e.g., the previously determined parameters determined by a content creator at manufacture).

In some implementations, the system may comprise one or more of, a sensor, a user interface, a processor, electronic storage, and/or other components.

The sensor may be configured to generate output signals conveying information related to a view direction of the user and/or other information. The view direction of the user may correspond to a physical direction toward which a gaze of the user is directed, an orientation of the user's body (e.g., the user may lean over) and/or a part of the user's body, a position of the user within the virtual space, and/or other directional information. For example, the view direction may include a first view direction that corresponds to a first physical direction toward which the gaze of the user is directed (e.g., the user may be looking in a forward direction) and a second view direction that corresponds to a second physical direction toward which the gaze of the user is directed (e.g., the user may turn around and look in a reverse direction).

The user interface may include a display and/or other components. The display may be configured to present the virtual reality content to the user. The display may be controlled by the processor to present the virtual reality content to the user such that the presented virtual reality content corresponds to a view direction of the user. In some implementations, the display may be included in a virtual reality headset worn by the user. It should be noted that the description of the display provided herein is not intended to be limiting. Rather, the description of the display is intended to include future evolutions of virtual reality display technology (which may not even be display based, for example). For example, the display may include cameras and/or systems for augmented reality, and/or other augmented reality components, light field imaging devices that project an image onto the back of a user's retina (e.g., near-eye light field displays, etc.) virtual reality technology that utilizes contact lenses, virtual reality technology that communicates directly with the brain, and/or other display technology.

The processor may be configured to execute computer program components. The computer program components may be configured to enable an expert and/or user to interface with the system and/or provide other functionality attributed herein to the user interface, the sensor, the electronic storage, and/or the processor. The computer program components may include a direction component, a content component, a display component, an interaction component, and/or other components.

The direction component may be configured to determine the view direction of the user based on the output signals from the sensor and/or based on other information. The direction component may be configured to determine whether the view direction of the user falls within a field of view for displaying virtual reality content to the user. Fields of view may be predetermined at manufacture (e.g., during creation of software, at physical manufacture, etc.), determined and/or adjusted by a user via the system, determined by the system based on the virtual reality content presented to the user, and/or determined by other methods. In some implementations, the direction component may be configured such that the fields of view share field boundaries. The direction component may determine whether the view direction of the user moves across a given field boundary between two different fields of view.

The content component may be configured to cause the display to present the virtual reality content to the user based on the determined view direction, the fields of view, and/or other information. The content component may be configured to cause the display to present primary virtual reality content, secondary virtual reality content, tertiary virtual reality content, etc., and/or other virtual reality content to the user. The content component may be configured such that primary virtual reality content is presented to the user responsive to the user's view direction being within a first field of view (e.g., a forward looking field of view), and secondary virtual reality content may be presented to the user when the user's view direction is within a second field of view (e.g., a rearward looking field of view), and so on for tertiary, etc., virtual reality content.

The display component may be configured to cause the display and/or other components of the system to provide one or more sensory cues (e.g., visual, auditory, somatosensory, olfactory, etc.) to the user responsive to the view direction of the user changing between fields of view. In some implementations, the sensory cue(s) may comprise a pause in the primary virtual reality content, a visually perceptible darkening of the primary virtual reality content and a brightening of the secondary, tertiary, etc., virtual reality content, and/or other sensory cues.

The interaction component may be configured to facilitate interaction between the user and the primary virtual reality content, interaction between the user and the secondary virtual reality content, interaction between the user and tertiary virtual reality content, etc., and/or other interaction. In some implementations, the interaction component may be configured to adjust the primary virtual reality content presented to the user based on interaction between the user and the secondary, tertiary, etc., virtual reality content, and/or based on other information. In some implementations, the interaction component may be configured to adjust the secondary, tertiary, etc., virtual reality content presented to the user based on interaction between the user and the primary virtual reality content, a progression of the user through the primary virtual reality content, and/or other information.

In some implementations, the interaction component may be configured to facilitate the creation, customization, and/or adjustment of the fields of view, the view boundaries, the virtual reality content, and/or other characteristics of the system. The interaction component may be configured to facilitate the creation, customization, and/or adjustment via the user interface and/or other components of the system.

The interaction component may cause the user interface to present one or more views of a graphical user interface to the user to facilitate the creation, customization, and/or adjustment. The one or more views may include one or more fields and/or overlays (e.g., the customization views may appear as separate field and/or as overlays on a particular field and/or in a particular scene in the virtual space) for creating, customizing, and/or adjusting the fields of view, the view boundaries, the virtual reality content, and/or other characteristics of the system. The one or more views may include one or more fields and/or overlays for previewing changes to the system before implementation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
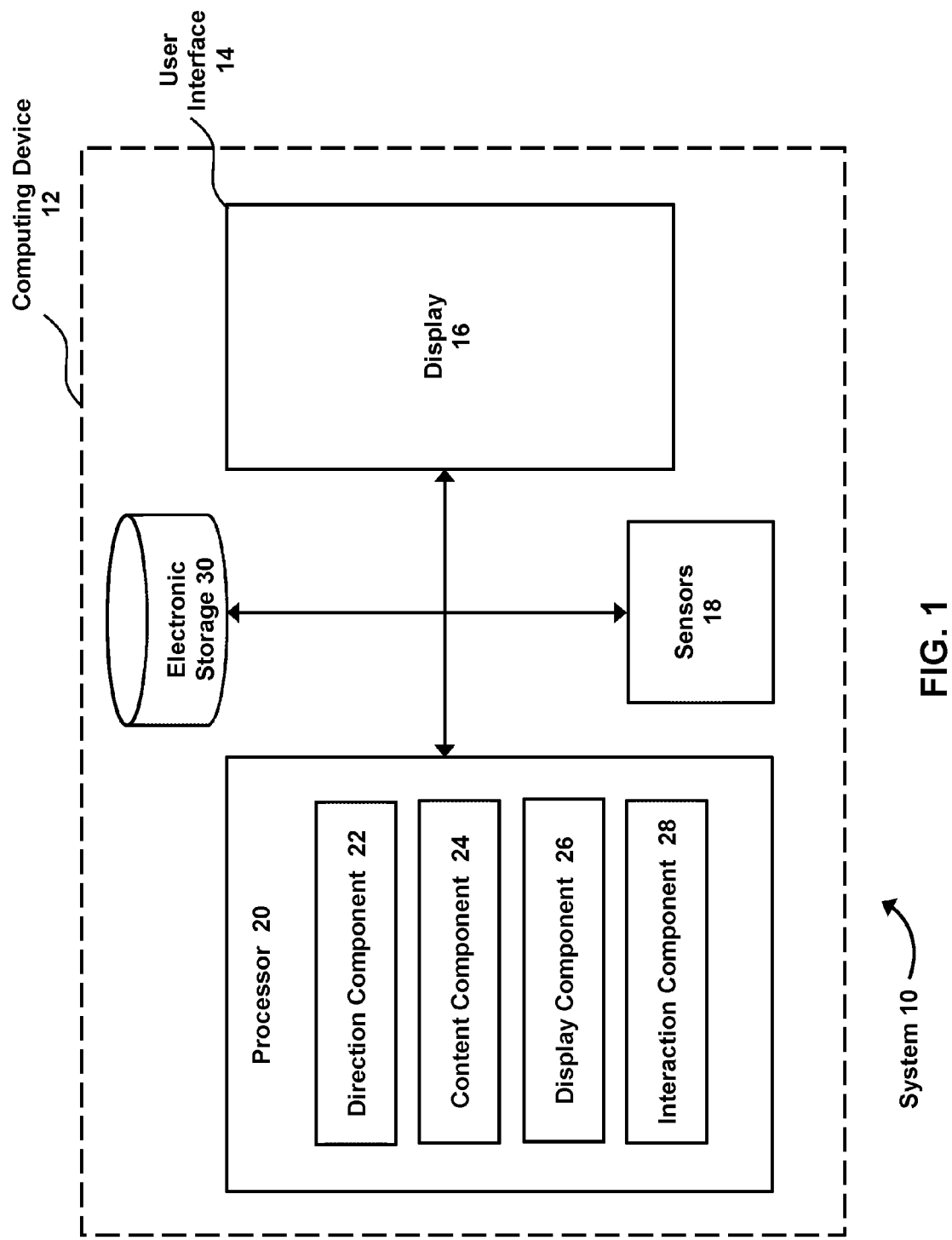
FIG. 1 illustrates an implementation of a system configured to present virtual reality content to a user.

The present system may facilitate storytelling using virtual reality via boundaries that divide a virtual space into areas where primary content, secondary content, tertiary content, etc. may be presented to the user. These boundaries may be indicated to a user in the virtual space via sensory cues so that the user understands and/or may become accustomed to what is considered on stage (e.g. primary content) and off stage (secondary, tertiary, etc. content), for example.

The present system may facilitate content governance by a content creator in one or more ways (e.g., defining the location of boundaries, creating virtual reality content that is presented to a user based on a user's virtual presence on one side of a boundary or another) that allow the content creator to direct a user's attention and/or point of view throughout a specific narrative, while allowing the user to pause and/or opt out and/or into other areas of the virtual space and/or narratives as defined by the boundaries, and also allowing the user to come back into and/or resume the original narrative. In some implementations, the present system may allow the content creator to maintain the attention of audience members (e.g., users) throughout the duration of a story and/or storytelling (e.g., during the entire length of a movie presented to a user in the virtual space).

It should be noted that the word "movie" as used herein is not intended to be limiting. It may refer to any passive and/or active narrative content and/or experience that system 10 is capable of displaying to a user.

For example, the present system may be configured such that the user's sense of boundaries becomes a thing that they may sense because they can hear/see/feel (described below) when they are approaching a boundary. Without the content creator having to tell and/or warn the user verbally (for example), the user may "sense" when they are going to cross a boundary, which gives the user an opportunity to choose whether or not they want to cross a particular boundary.

In some implementations, the present system may facilitate a content creator's ability to use classic storytelling techniques such as cuts and/or dissolves. In some implementations, the present system may facilitate a user's ability to choose between boundary defined areas of content (e.g., some of which may be narrative experiences) without having to lose track of primary, secondary, tertiary, etc., virtual reality content presented on the other side of a boundary. For example, a user may enjoy multiple areas of different types of experiences (e.g., passive and/or interactive) within a virtual world, while having individual narratives pause when the user disengages to move to another experience and then resume when the user returns to the narrative. The present system may facilitate storytelling at a rhythm, pacing, and/or style intended by the content creator.

The terms "primary virtual reality content" and "secondary virtual reality content" used herein are not intended to be limiting. The system may include any number of different types of virtual reality content. "Primary" and "secondary" may be used generically throughout this disclosure to represent various different types of virtual reality content. The functionality described herein may be applied to any number of different types (e.g., primary, secondary, tertiary, etc.) of virtual reality content. In some implementations, secondary virtual content may refer to any virtual reality content that is not primary virtual reality content (e.g., secondary virtual reality content may include several different types of virtual reality content).

FIG. 1 illustrates an implementation of a system 10 configured to present virtual reality content to a user. The virtual reality content may be presented to the user in a virtual space. The virtual reality content may include primary virtual reality content, secondary virtual reality content, tertiary virtual reality content, etc., and/or other virtual reality content. System 10 may be configured such that primary virtual reality content may be displayed to a user, and, responsive to the user turning his view and/or otherwise moving away from the primary virtual reality content, one or more sensory cues may be provided to the user that indicates to the user that his view is no longer directed toward the primary virtual reality content. At such times the primary virtual reality content may be paused and secondary, tertiary, etc., and/or other virtual reality content may be displayed to the user. System 10 may be configured to determine that a view direction of the user has moved across a field boundary between a first field of view where the primary virtual reality content is displayed and a second field of view where, for example, secondary virtual reality content may be displayed. (This applies for example, to any one of several boundaries that separate any two fields of view). The view direction of the user may refer to a direction toward which the user's gaze is directed, an orientation of the user's gaze (e.g., the user may tilt his head and/or lean over), a position of the user within the virtual space, and/or other directional and/or positional information (e.g., a user may move his position in the virtual space across a boundary). The primary virtual reality content may resume when the user returns his view to the primary virtual reality content first field of view. The primary virtual reality content subsequently displayed to the user may be adjusted based on a user's interaction with the secondary (tertiary, etc.) virtual reality content and/or other information. The secondary (tertiary, etc.) virtual reality content may be adjusted based on a user's progression through the primary virtual reality content, interaction with the primary virtual reality content, and/or other information.

By way of a non-limiting example, system 10 may be configured such that the virtual reality content is displayed to the user via a virtual reality headset. In this example, the primary virtual reality content may be a movie (2D and/or 3D displayed content, captured video, 2D and/or 3D generated content, digitally created characters, objects, and spaces, algorithmically created content), and/or any other primary virtual reality content displayed to the user. The movie may be displayed to the user while the user looks in a forward direction (e.g., the user's view direction is within the first field of view). Responsive to the user turning his view from the primary virtual reality content (e.g., left or right, up or down, and/or other directions) and/or otherwise moving away from the primary virtual reality content in the virtual space, a sensory cue comprising a visually perceptible darkening of the primary virtual reality content (e.g., a movie), a brightening of related (e.g., movie characters, objects seen in the movie, a setting of the movie, an extension of the setting of the movie, etc.) secondary, tertiary, etc., virtual reality content, a slowing to a stop of the primary virtual reality content (e.g., a slowing to a stop of the movie and/or the movie sound), and/or other cues (described below for example) may be displayed to the user. The secondary, tertiary, etc., virtual reality content may be determined by system 10 based on the user's progression through the movie (e.g., as characters are introduced in the movie they may be added to the secondary, tertiary, etc., virtual reality content), based on a user's interaction with the movie (e.g., a user may repeatedly look over to a particular character in the movie which the user is then able to interact with as secondary, tertiary, etc., virtual reality content), and/or based on other information. The user may interact with the secondary, tertiary, etc., virtual reality content and then return his view back to the movie wherein the movie has been adjusted to reflect the user's interaction with the secondary, tertiary, etc., virtual reality content. In some implementations, while a user views primary virtual reality content, system 10 may be configured to display a "pop-up" cue indicating that additional virtual reality content (e.g., additional characters) is available in a different (e.g., secondary, tertiary, etc.) content area.

In some implementations, system 10 may be configured such that a user may create, customize, and/or adjust the virtual reality content, the fields of view, view boundaries, and/or other characteristics of system 10. System 10 may be configured such that a user may set and/or adjust the fields of view, the field boundaries, relationships between the primary virtual reality content and the secondary, tertiary, etc., virtual reality content, types of interactions between the user and the primary virtual reality content and/or between the user and secondary, tertiary, etc., virtual reality content, and/or other content creation and/or adjustment activities (described in greater detail below).

In some implementations, system 10 may comprise one or more of a user interface 14 (which may include a display 16 and/or other components as described herein), a sensor 18, a processor 20, electronic storage 30, and/or other components. In some implementations, one or more components of system 10 may be included in a single computing device 12. In some implementations, computing device 12 may be associated with the user. For example, computing device 12 may be owned by the user, carried by the user, operated by the user, and/or associated with the user in other ways. Computing device 12 may include communication lines, or ports to enable the exchange of information with a network, and/or other computing platforms. Computing device 12 may include a plurality of hardware, software, and/or firmware components operating together to provide the functionality attributed herein to computing device 12. Computing device 12 may include, for example, a cellular telephone, a smartphone, a laptop, a tablet computer, a desktop computer, a television set-top box, smart TV, a gaming console, a virtual reality headset, and/or other devices. In some implementations, individual components of system 10 (e.g., display 16, sensors 18) may be coupled to (e.g., wired to, configured to wirelessly communicate with) computing device 12 without being included in computing device 12.

In some implementations, computing device 12 may include one or more components (e.g., hardware and/or software) configured to facilitate tracking physical user movements and/or position for use by system 10. This may include, for example, rotational, positional, and/or other types of user body tracking used in virtual reality experiences. This may include components configured to generate information related to a user's brain waves in real time that can be used by system 10 to control one or more aspects of the virtual space.

Figure 2:
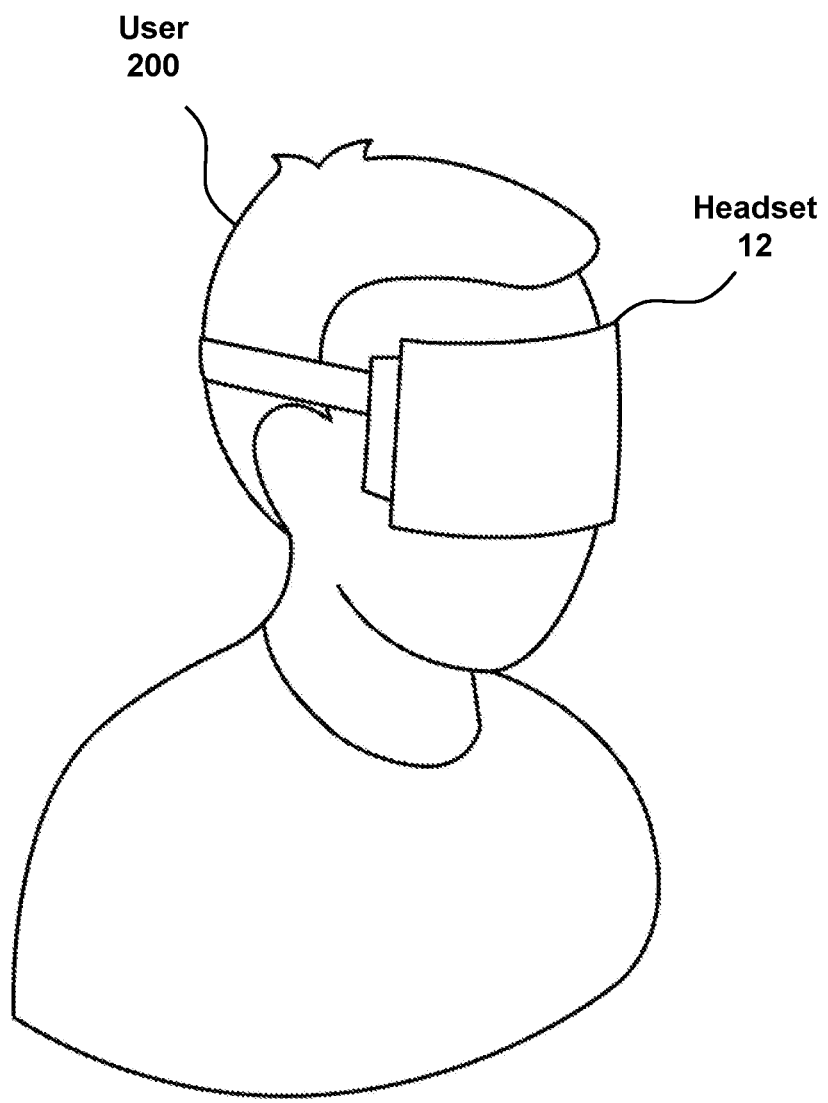
FIG. 2 illustrates a virtual reality headset computing device.

For example, in FIG. 2, computing device 12 is illustrated as a virtual reality headset that is worn on the head of a user 200. The virtual reality content may be presented to the user in a virtual space via a display included in the headset. The virtual reality headset may be configured such that a perception of a three dimensional space is created by two stereoscopic movies, one generated for each eye, that are each being rendered in real time and then displayed. The convergence of these two movies in real time—one image to each eye (along with how those views are reactive to viewer head rotation and position in space)—may create a specific kind of immersive 3D effect and/or a sensation of presence in a virtual world. Presenting the virtual reality content to the user in the virtual space may include presenting one or more views of the virtual space to the user. Users may participate in the virtual space by interacting with content presented to the user in the virtual space. The content presented to the user may include movies, performances, virtual events, characters, objects, settings, collaborative projects including objects and sculptures, bonus material, chapter selection control, play controls, editing controls, director commentary, a virtual tour of a (e.g., movie) set, a behind the scenes tour (e.g., with the content creator physically walking a user through the scenes in the virtual space as an avatar and/or performance capture of some kind), stage plays, virtual phone calls, chat windows, communication windows of different varieties, algorithmically generated content, animated content, flat and/or dimensionally captured performances and/or spaces, procedurally animated content, artificially intelligent animations, live and/or pre-recorded events, avatars of other users (e.g., prerecorded and/or live), and/or other content. For example, a user may communicate with presented characters, and/or may socially interact in other ways with virtual characters and/or other users in the virtual space. Socially interacting may include communicating, chatting, playing a game, viewing virtual reality content, attending an event, and/or other socializing. This socializing may be taking place while the virtual reality content is being displayed to the user, for example, such that multiple users may interact based on the same virtual reality content. The virtual space may include objects that are usable within the virtual space such as tools, food, a virtual currency, virtual clothing (e.g., shirt, hat, pants, etc.), a vehicle, a pet, and/or other virtual items and/or goods. In some implementations, the virtual reality content may be similarly presented to the user via one or more screens, projection devices, three dimensional image generation devices, light field imaging devices that project an image onto the back of a user's retina, virtual reality technology that utilizes contact lenses, virtual reality technology that communicates directly with (e.g., transmits signals to and/or receives signals from) the brain, and/or other devices configured to display the virtual reality content to the user.

In some implementations, a user may pause the displayed virtual reality content to browse the web, use the internet within the virtual space, and/or perform another virtual reality web interaction. In some implementations, the displayed virtual content may continue while the user browses the web, uses the internet within the virtual space, and/or performs another virtual reality web interaction. In some implementations, corresponding web pages may be three dimensional virtual spaces that may be visited by the user. In some implementations, the present system may be configured to layer such web browsing experience on top of the virtual reality content presented to the user which may or may not cause a pause in a story (for example) that is being presented to the user.

Views of the virtual space may correspond to a location in the virtual space (e.g., a location in a scene of a movie). The location may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The views of the virtual space may be presented to the user such that a user may move through the virtual space and interact with the virtual space as the user would move through and interact with a corresponding physical space. For example, a user may walk and/or run through the virtual space, sit down, stand up, stop and observe an object in the virtual space, look up/down/left/right/etc., lean to look around an object in the virtual space, and/or other movements and/or interactions.

The above description of the views of the virtual space is not intended to be limiting. The virtual space may be expressed in a more limited, or richer, manner. For example, in some implementations, views determined for the virtual space may be selected from a limited set of graphics depicting an event in a given place within the virtual space. In some implementations, views determined for the virtual space may include additional content (e.g., text, audio, pre-stored video content, and/or other content) that describe, augment, and/or overlay particulars of the current, previous, and/or future state of the place.

Returning to FIG. 1, as described above, the virtual reality content may be presented to the user in a virtual space. In some implementations, the virtual space may be hosted by a server over a network, such as the Internet. The virtual space may be accessed by users via computing devices, such as computing device 12 (e.g., computing device 12 may be a client computing device). This may facilitate networked viewing of virtual reality content (e.g., a movie). Multiple viewers (users) may view the same virtual reality content together at the same time, but in different locations, with their own computing devices. In other words, users who are in different physical locations may enjoy the same virtual reality content at the same time and/or access a recording of an earlier shared and/or saved experience and view it later. Such an implementation is illustrated in FIG. 3.

Figure 3:
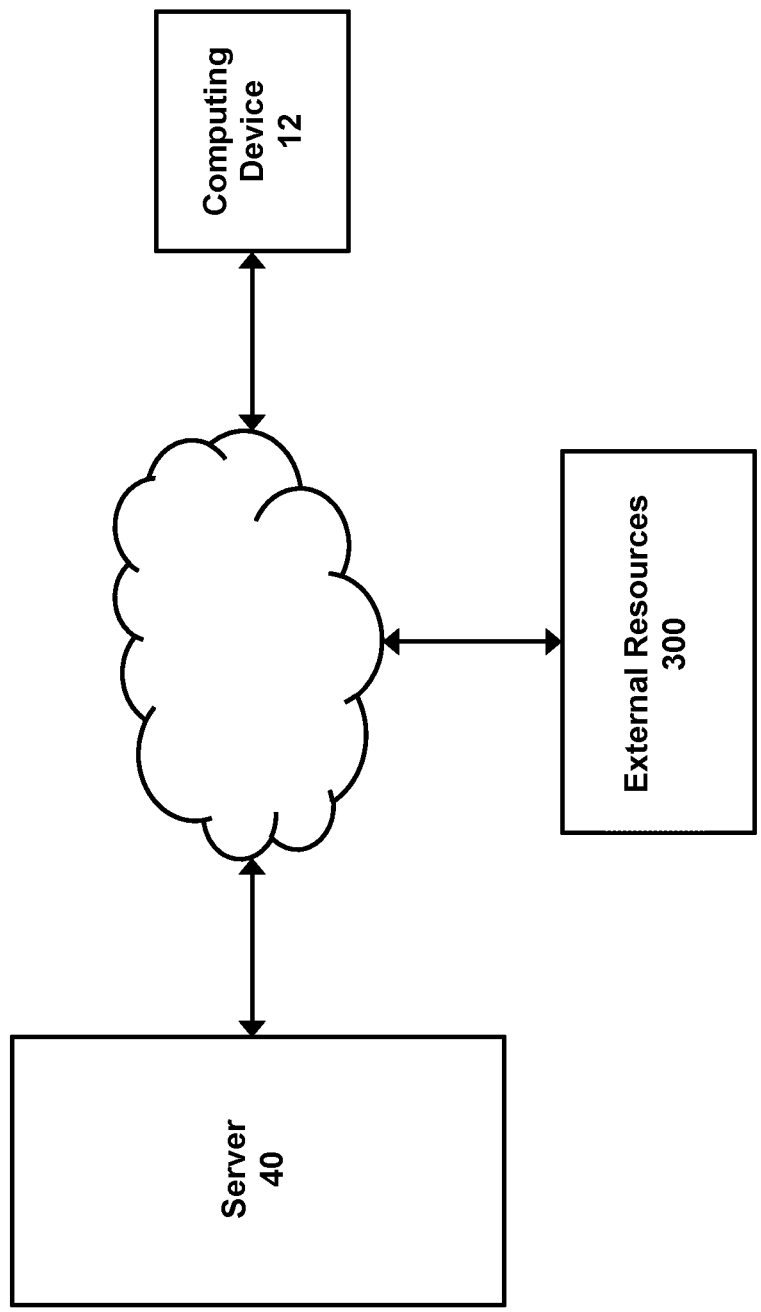
FIG. 3 illustrates a server configured to communicate with a computing device via a network.

FIG. 3 illustrates a server 40 configured to communicate with computing device 12 via a network. In some implementations, server 40 may be configured to provide the virtual space by hosting the virtual space over a network, such as the Internet. Server 40 may include electronic storage, one or more processors, communication components, and/or other components. Server 40 may include communication lines, or ports to enable the exchange of information with a network and/or other computing platforms. Server 40 may include a plurality of hardware, software, and/or firmware components operating together to provide the functionality attributed herein to server 40. For example, server 40 may be implemented by a cloud of computing platforms operating together as server 40.

Server 40 may be configured to execute computer readable instructions for implementing an instance of the virtual space and to facilitate the participation of one or more users in the virtual space. For example, server 40 may be configured such that one or more users may watch the same narrative (e.g., a movie) and/or have the same experience and interact while in the virtual space. In some implementations, server 40 may be configured such that one viewer in a networked and/or otherwise linked group of viewers viewing the same content is designated as a leader and controls playback for the entire group, (e.g., automatically resuming playback for individual user's computing devices when the leader resumes). Server 40 may be configured such that the leader may also engage any other controls for the entire group, including but not limited to program options and/or playback control beyond play and pause functions. In some implementations, server 40 may be configured such that, responsive to one or more individual users (the specific number of users may be pre-set by a content creator for example, and/or determined in other ways) in a group of users viewing the same content crossing a boundary, the content may be paused and/or resumed as appropriate. Individual users may access server 40 and/or the virtual space via computing device 12, for example. Server 40 may be configured to communicate virtual space information (e.g., streaming visual information, object/position information, and/or other information) to computing device 12 for presentation to the user and/or to other client computing platforms and/or other users. Server 40, computing device 12, and/or external resources 300 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 40, computing device 12, and/or external resources 300 may be operatively linked via some other communication media. In some implementations, the virtual space may include an "offline" version of the virtual space. For example, the virtual space may be hosted locally on computing device 12.

External resources 300 may include sources of information that are outside of system 10, external entities participating with system 10, and/or other resources. In some implementations, some or all of the functionality attributed herein to external resources 300 may be provided by resources included in system 10.

Returning to FIG. 1, sensors 18 may be configured to generate output signals conveying information related to a view direction of the user and/or other information. The view direction of the user may correspond to a physical direction toward which a gaze of the user is directed, an orientation of one or more parts of the user's body (e.g., the user's head may be tilted, the user may be leaning over), a position of a user within the virtual space, and/or other directional information. For example, the view direction may include a first view direction that corresponds to a first physical direction toward which the gaze of the user is directed (e.g., the user may be looking in a forward direction) and a second view direction that corresponds to a second physical direction toward which the gaze of the user is directed (e.g., the user may turn around and look in a reverse direction). This example is not intended to be limiting. Sensors 18 may be configured to generate output signals conveying information related to any number of different view directions of the user. In some implementations, sensors 18 may include one or more of a GPS sensor, a gyroscope, an accelerometer, an altimeter, a compass, a camera based sensor, a magnetic sensor, an optical sensor, an infrared sensor, a motion tracking sensor, an inertial sensor, a CCB sensor, an eye tracking sensor, a facial tracking sensor, a body tracking sensor, and/or other sensors.

User interface 14 may be configured to provide an interface between system 10 and the user through which the user may provide information to and receive information from system 10. This enables data, cues, results, and/or instructions and any other communicable items, collectively referred to as "information," to be communicated between the user and system 10. By way of a non-limiting example, user interface 14 may be configured to display the virtual reality content to the user. Examples of interface devices suitable for inclusion in user interface 14 include a touch screen, a keypad, touch sensitive and/or physical buttons, switches, a keyboard, knobs, levers, a display (e.g., display 16), speakers, a microphone, an indicator light, a printer, and/or other interface devices. In some implementations, user interface 14 includes a plurality of separate interfaces (e.g., multiple displays 16). In some implementations, user interface 14 includes at least one interface that is provided integrally with processor 20. In some implementations, user interface 14 may be included in computing device 12 (e.g., a desktop computer, a laptop computer, a tablet computer, a smartphone, a virtual reality headset, etc.) associated with an individual user. In some implementations, user interface 14 may be included in a first computing device (e.g., a virtual reality headset) that is located remotely from a second computing device (e.g., server 40 shown in FIG. 3).

It is to be understood that other communication techniques, either hard-wired or wireless, are also contemplated by the present disclosure as user interface 14. For example, the present disclosure contemplates that user interface 14 may be integrated with a removable storage interface provided by electronic storage 30. In this example, information may be loaded into system 10 from removable storage (e.g., a smart card, a flash drive, a removable disk) that enables the user to customize the implementation of system 10. Other exemplary input devices and techniques adapted for use with system 10 as user interface 14 include, but are not limited to, an RS-232 port, RF link, an IR link, modem (telephone, cable or other), a USB port, Thunderbolt, a Bluetooth connection, and/or other input devices and/or techniques. In short, any technique for communicating information with system 10 is contemplated by the present disclosure as user interface 14.

Display 16 may be configured to present the virtual reality content to the user. Display 16 may be configured to present the virtual reality content to the user such that the presented virtual reality content corresponds to a view direction of the user. Display 16 may be controlled by processor 20 to present the virtual reality content to the user such that the presented virtual reality content corresponds to a view direction of the user. Display 16 may include one or more screens, projection devices, three dimensional image generation devices, light field imaging devices that project an image onto the back of a user's retina, virtual reality technology that utilizes contact lenses, virtual reality technology that communicates directly with (e.g., transmitting signals to and/or receiving signals from) the brain, and/or other devices configured to display the virtual reality content to the user. The one or more screens and/or other devices may be electronically and/or physically coupled, and/or may be separate from each other. As described above, in some implementations, display 16 may be included in a virtual reality headset worn by the user. In some implementations, display 16 may be a single screen and/or multiple screens included in a computing device 12 (e.g., a cellular telephone, a smartphone, a laptop, a tablet computer, a desktop computer, a television set-top box/television, smart TV, a gaming system, a virtual reality headset, and/or other devices). In some implementations, display 16 may include a plurality of screens physically arranged about a user such that when a user looks in different directions, the plurality of screens presents individual portions (e.g., that correspond to specific view directions and/or fields of view) of the virtual reality content to the user on individual screens.

Processor 20 may be configured to provide information processing capabilities in system 10. Processor 20 may communicate wirelessly with user interface 14, sensors 18, electronic storage 30, external resources not shown in FIG. 1, and/or other components of system 10. In some implementations, processor 20 may communicate with user interface 14, sensors 18, electronic storage 30, external resources not shown in FIG. 1, and/or other components of system 10 via wires. In some implementations, processor 20 may be remotely located (e.g., within server 40 shown in FIG. 3) relative to user interface 14, sensors 18, electronic storage 30, external resources not shown in FIG. 1, and/or other components of system 10.

Processor 20 may be configured to execute computer program components. The computer program components may be configured to enable an expert and/or user to interface with system 10 and/or provide other functionality attributed herein to user interface 14, sensors 18, electronic storage 30, and/or processor 20. The computer program components may include a direction component 22, a content component 24, a display component 26, an interaction component 28, and/or other components.

Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may comprise a plurality of processing units. These processing units may be physically located within the same device (e.g., a server, a desktop computer, a laptop computer, a tablet computer, a smartphone, a virtual reality headset, and/or other computing devices), or processor 20 may represent processing functionality of a plurality of devices operating in coordination (e.g., a plurality of servers, a server and a computing device 12). Processor 20 may be configured to execute components 22, 24, 26, and/or 28 by software; hardware; firmware; some combination of software, hardware, and/or firmware; and/or other mechanisms for configuring processing capabilities on processor 20.

It should be appreciated that although components 22, 24, 26, and 28 are illustrated in FIG. 1 as being co-located within a single processing unit, in implementations in which processor 20 comprises multiple processing units, one or more of components 22, 24, 26, and/or 28 may be located remotely from the other components (e.g., such as within server 40 shown in FIG. 3). The description of the functionality provided by the different components 22, 24, 26, and/or 28 described herein is for illustrative purposes, and is not intended to be limiting, as any of components 22, 24, 26, and/or 28 may provide more or less functionality than is described. For example, one or more of components 22, 24, 26, and/or 28 may be eliminated, and some or all of its functionality may be provided by other components 22, 24, 26, and/or 28. As another example, processor 20 may be configured to execute one or more additional components that may perform some or all of the functionality attributed below to one of components 22, 24, 26, and/or 28. In some implementations, one or more of components 22, 24, 26, and/or 28 may be executed by a processor incorporated in a remotely located server, and/or other components of system 10.

Direction component 22 may be configured to determine the view direction of the user based on the output signals from sensors 18 and/or based on other information. The view direction of the user may refer to a direction toward which the user's gaze is directed, an orientation of the user's gaze (e.g., the user may tilt his head), a position of the user within the virtual space (e.g., direction component 22 may be configured to track a user's position with the virtual space), and/or other directional and/or positional information (e.g., a user may move his position in the virtual space across a boundary). Direction component 22 may be configured to determine whether the view direction of the user falls within a predetermined field of view for displaying virtual reality content to the user. Predetermined fields of view may be determined at manufacture, determined and/or adjusted by a user via system 10 (described below), determined by system 10 based on the virtual reality content presented to the user, and/or determined by other methods. In some implementations, direction component 22 may be configured such that the fields of view share field boundaries. For example, a first field of view (e.g., that corresponds to a forward facing gaze of a user) and a second field of view (e.g., that corresponds to a reverse facing gaze of a user) may share a first field boundary. Direction component 22 may determine whether the view direction of the user moves across a given field boundary between two different fields of view.

Figure 4A:
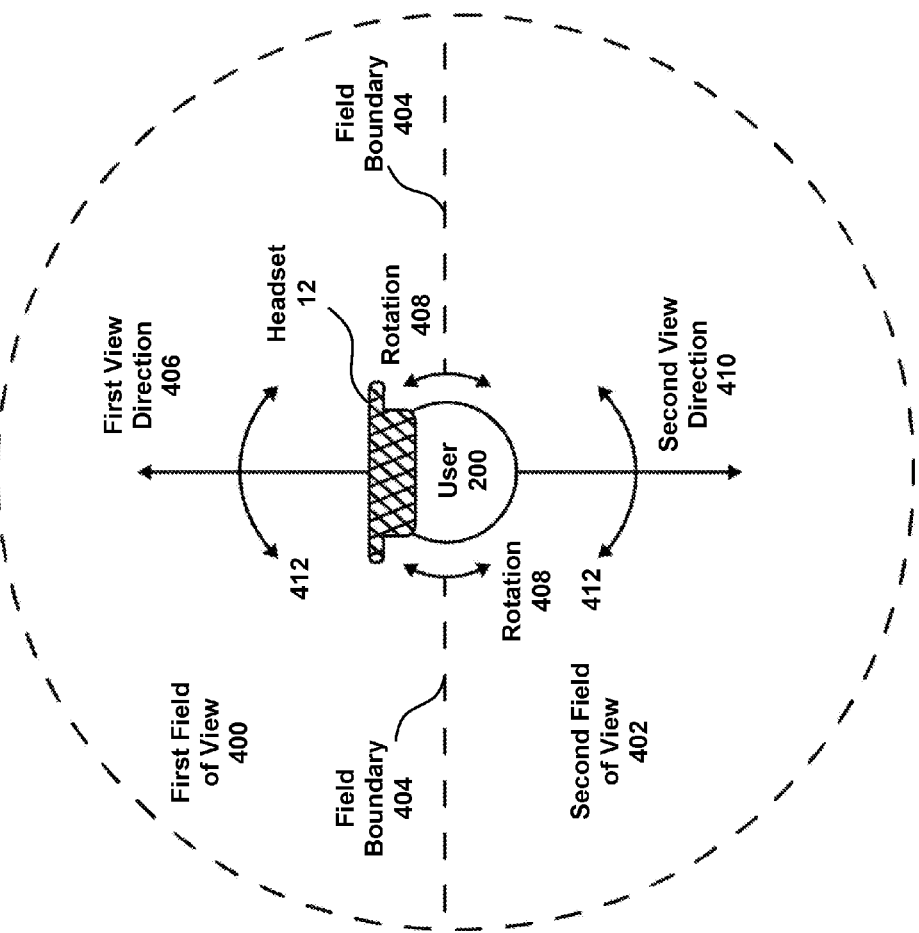
FIG. 4A illustrates a top view of individual fields of view that share a field boundary.

FIG. 4A illustrates a top view of individual fields of view 400 402 that share a field boundary 404. In FIG. 4A, first field of view 400 and second field of view 402 share field boundary 404. User 200 is illustrated wearing virtual reality headset computing device 12 gazing in first view direction 406 (e.g., facing forward). Direction component 22 (FIG. 1) may be configured to determine that first view direction 406 falls within first field of view 400. Responsive to user 200 rotating 408 his head (and/or otherwise reorienting his body by bending, leaning, walking, running, and/or other moving into a different field of view) to gaze in second view direction 410 (e.g., facing in a reverse direction), direction component 22 (FIG. 1) may determine (e.g., detect based on the output signals from sensors 18) that the view direction of user 200 moved across field boundary 404 from first field of view 400 to second field of view 402. (Direction component 22 is configured such that this works similarly in the reverse direction.) In some implementations, direction component 22 may be configured to determine that the view direction of user 200 has rotated 408 from first field of view 400 to second field of view 402 (or from second field of view 402 to first field of view 400) across a field boundary by determining an amount of view direction rotation 412 (e.g., a number of degrees of rotation) in a given direction (and/or in multiple directions). For example, a user may rotate his view left/right, up/down, and/or in other directions. The amount of view direction rotation 412 may be determined relative to a current starting position (e.g., determined by direction component 22 based on a current position of the head of user 200), a reference view direction, positional coordinates and/or other positional information (e.g., positional coordinates in 3D space), and/or other information. This description of the fields of view, view directions, field boundaries, and/or rotating a view direction is not intended to be limiting. Direction component 22 and/or system 10 may be configured such that there are any number of fields of view, field boundaries, rotation, and/or view directions provided system 10 functions as described herein. FIG. 4A is a two dimensional illustration which is not intended to be limiting. The fields of view, field boundaries, rotation (e.g. tilting), view directions, and/or other features of system 10 described herein also apply in three dimensions.

Returning to FIG. 1, in some implementations, direction component 22 may be configured such that a user may change his view direction without physically changing his gaze direction, leaning, and/or moving into a different field of view. In some implementations, direction component 22 may be configured such that a user may change his view direction by making a partial movement in the direction of a desired field of view (and/or in some other indicative direction) without actually moving across the boundary of his current field of view. This partial movement may indicate to direction component 22 that the user desires to change fields of view and, in response, direction component 22 may change the user's field of view.

In some implementations, direction component 22 may be configured such that a user may change his view direction by using one or more controls provided via user interface 14 and/or other controls. For example, the user may use a pointer (a physical pointer such as a mouse and/or other pointer and/or a virtual pointer displayed in the virtual space), a gaming type controller, and/or other controllers to indicate his desire to change fields of view. In some implementations, the one or more controls provided via user interface 14 may include gesture based controls (e.g., swiping, pinching, expanding a pinch, moving a hand, arm, and/or other body parts, making a specific motion with a body part, etc.)

Content component 24 may be configured to cause display 16 to present the virtual reality content to the user based on the determined view direction, the fields of view, and/or other information. Content component 24 may be configured to cause display 16 to present primary virtual reality content, secondary virtual reality content, tertiary virtual reality content, etc., and/or other virtual reality content to the user. Primary virtual reality content may include movies, performances, virtual events, video games, interactive games, simulated physical world settings, characters, objects, collaborative projects including objects and sculptures, bonus material, chapter selection control, play controls, editing controls, director commentary, a virtual tour of a (e.g., movie) set, a behind the scenes tour (e.g., with the content creator physically walking a user through the scenes in the virtual space as an avatar and/or performance capture of some kind, stage plays, virtual phone calls, chat windows, communication windows of different varieties, algorithmically generated content, animated content, flat and/or dimensionally captured performances and/or spaces, procedurally generated animated content, artificially intelligent animations, live and/or pre-recorded events, avatars of other users (e.g., prerecorded and/or live), and/or other virtual reality content. Secondary, tertiary, etc., virtual reality content may include individual characters, objects that are part of a specific setting, objects that are usable within the virtual space such as tools, food, a virtual currency, virtual clothing (e.g., shirt, hat, pants, etc.), a vehicle, a pet, movies, performances, virtual events, characters, objects, settings, collaborative projects including objects and sculptures, bonus material, chapter selection control, play controls, editing controls, director commentary, a virtual tour of a (e.g., movie) set, a behind the scenes tour (e.g., with the content creator physically walking a user through the scenes in the virtual space as an avatar and/or performance capture of some kind, stage plays, virtual phone calls, chat windows, communication windows of different varieties, algorithmically generated content, animated content, flat and/or dimensionally captured performances and/or spaces, procedurally generated animated content, artificially intelligent animations, live and/or pre-recorded events, avatars of other users (e.g., prerecorded and/or live), and/or other virtual reality content.

Content component 24 may be configured such that primary virtual reality content is presented to the user responsive to the user's view direction being within a first field of view (e.g., a forward looking field of view), and secondary virtual reality content may be presented to the user when the user's view direction is within a second field of view (e.g., a rearward looking field of view), and so on for tertiary, etc., virtual reality content. In some implementations, content component 24 may be configured to change the virtual reality content displayed to the user responsive to the user's view direction moving across a field boundary (e.g., between two different fields of view), based on an amount of view direction rotation, and/or based on other information. In some implementations, content component 24 may be configured such that primary virtual reality content is presented to the user when the user's view direction is within the first field of view and secondary, tertiary, etc., virtual reality content is presented to the user when the user's view direction is anywhere outside the first field of view. In some implementations, content component 24 may be configured to cause display 16 to pause the presentation of the primary virtual reality content responsive to the view direction of the user (e.g., which includes a physical body position of the user, a location of the user in physical space and/or in the virtual space as described herein, a physical body orientation of the user) changing from the first field of view to the second field of view, and/or any other field of view.

In some implementations, system 10 may be configured such that a user may manually pause the presentation of the primary, secondary, tertiary, etc., virtual reality content (e.g., via user interface 14). For example, system 10 may be configured such that a user may pause, stop, play, rewind, and/or otherwise have typical video playback control over the (primary, secondary, tertiary, etc.) virtual reality content via user interface 14. In some implementations, this control may be individual for content in a specific field of view (e.g., only the primary content is controlled), and/or collective for content in two or more fields of view (e.g., primary, secondary, tertiary, etc. content may be controlled at once).

Display component 26 may be configured to cause display 16 and/or other components of system 10 to provide one or more sensory cues to the user responsive to the view direction of the user changing between fields of view. Display component 26 may be configured to cause display 16 and/or other components of system 10 to provide a sensory cue(s) to the user responsive to the view direction of the user moving across a field boundary between fields of view. For example, display component 26 may be configured to cause display 16 to provide a sensory cue(s) to the user responsive to the view direction of the user changing between the first field of view and the second field of view (and/or any other field of view). In some implementations, display component 26 may be configured to cause display 16 to provide a sensory cue(s) based an amount of view direction rotation (described above), and/or other information.

In some implementations, the one or more sensory cues may comprise a pause in the primary virtual reality content, a slowing to a stop of the primary virtual reality content, a visually perceptible darkening of the primary virtual reality content, a brightening of the secondary, tertiary, etc., virtual reality content, and/or other visual cues. For example, system 10 may be configured to display a movie (e.g., primary virtual reality content) to the user while the user looks in a forward looking view direction that is within a first field of view. While watching the movie, areas of the virtual space at the edges of the user's peripheral vision and/or behind the user (e.g., outside the first field of view) may be visually darkened. When the user rotates his head and looks in a different direction that is outside the first field of view, the movie may be paused and/or visually darkened. The previously darkened areas of the virtual space toward the user's peripheral vision and/or behind the user may be brightened so that the user may interact with virtual reality content (e.g., secondary, tertiary, etc., virtual reality content) in those areas of the visual space. In some implementations, display component 26 may be configured to cause other sensory cues (e.g., via other components of user interface 14, external resources 300 (FIG. 3)) to be provided to the user. Other sensory cues may include other visual cues (e.g., a flashing visual indicator that is part of user interface 14), auditory cues (e.g., sounds produced by user interface 14 responsive to the user's view direction moving across a field boundary such as audio from the primary virtual reality content slowing to a stop, speaker vibration cues), somatosensory cues (e.g., tactile cues such as a virtual reality headset vibration, vibration of a surface the user is physically standing on, etc.), olfactory cues (e.g., a scent produced by external resources 300 responsive to a user looking in a reverse direction toward a forest of trees), haptic feedback, climate adjustment cues (e.g., heated and/or cooled air delivered to the user), weather related cues (e.g., changes in virtual weather from one weather condition to another such as sun, rain, wind, snow, sleet, etc.), motion simulation (e.g., as from a motion simulator) and/or actual physical motion cues (e.g., physically rotating and/or otherwise moving in different directions by controlling external equipment associated with system 10), and/or other sensory cues. In some implementations, display component 26 may be configured to cause display 16 and/or other components of system 10 to vary an intensity of an individual cue and/or provide more than one cue at a time.

In some implementations, such as when computing device 12 is a virtual reality headset, display component 26 may be configured to cause display 16 to stop and/or pause presenting the virtual reality content to the user responsive to the user removing the virtual reality headset from his head. For example, sensors 18 may be configured to generate output signals that convey information that indicates whether the user is wearing the virtual reality headset. Display component 26 may be configured to cause display 16 to cease presenting the virtual reality content responsive to the information conveyed by the output signals indicating that the user is no longer wearing the virtual reality headset.

In some implementations, display component 26 may be configured to cause display 16 to resume (e.g., automatically) presenting the virtual reality content to the user responsive to the user replacing the virtual reality headset on his head. The virtual reality content may resume from the point where it left off when the headset was removed. In some implementations, display component 26 may be configured to cause display 16 to automatically present the virtual reality content to the user responsive to the user placing the virtual reality headset on his head for the first time. In some implementations, the virtual reality content may re-start from the beginning of the virtual reality content, re-start from where it left off when the headset was removed, re-start from a content creator specified start point, and/or from other points. This may be defined by the content creator, for example.

Interaction component 28 may be configured to facilitate interaction between the user and the primary virtual reality content, interaction between the user and the secondary, tertiary, etc., virtual reality content, and/or other interaction. Interaction may include facilitating control of virtual space entities (characters, objects, etc.), control of simulated physical phenomena (e.g., wind, rain, earthquakes, and/or other phenomena), control of a scene and/or a setting in the virtual space, and/or control over other elements within the virtual space and/or other virtual reality content presented to the user.

Interaction may include conversing (e.g., textual chatting, voice communication, etc.) with and/or otherwise socializing with virtual characters such as avatars, other characters, and/or other users. For example, interaction component 28 may be configured to facilitate communication via chat applications that utilize pop-up windows and/or pop-up avatars, pop-up point cloud video chat, and/or otherwise to allow a user to quickly respond to social media messages, and/or take a "phone call" and then automatically resume viewing content when finished. In some implementations, interacting with "off stage" characters may be an out of narrative (e.g., primary virtual reality content) function. Interaction may include moving, creating, and/or customizing objects and/or other elements in the virtual space by the user (e.g., based on information received via computing device 12 and/or other information). In some implementations, interaction may include browsing the internet as described above.

Interaction may include participating in an instance of the virtual space (e.g., a scene in a movie) by controlling one or more available user controlled entities in the virtual space. Such control may be exercised through control inputs and/or commands input by the user through computing device 12, for example. Interaction may include repeatedly looking in a specific direction within a field of view (e.g., at a specific character). Interaction may include repeatedly looking at and/or otherwise directing attention toward a specific character, object, and/or location in the virtual space; making facial expressions that express an attitude toward a specific character, object, and/or location in the virtual space; and/or other interaction (e.g., determined based on output signals from eye tracking, facial tracking, brain wave, body tracking sensors, and/or other sensors included in sensors 18). In some implementations, participating in the virtual space may include being led through the virtual space by a character and/or avatar (e.g., a character and/or avatar that corresponds to a director of a movie and/or content creator of the virtual reality content, an actor in the movie, and/or another guide character and/or avatar that may be unrelated to the virtual reality content) wherein the character and/or avatar walks the user through a scene in the virtual space and points things out. System 10 may be configured such that this type of guide interaction may be a layer (e.g., like a commentary track on a DVD) that may be turned on and/or off and may change the content stream as a result (e.g., configurable by creator and/or user as allowed).

Interaction component 28 may be configured such that interaction includes handshakes, exchanges of goods, physical fights, side adventures with a particular character, travel and/or flight with characters and/or objects, moving objects and/or characters, knocking things over, picking things up, damaging objects in the virtual space, creating graffiti, blasting the objects, characters, and/or other features of the virtual space with different elements such as forces of nature (e.g., wind, rain, snow, fire, etc.) and/or other elements, solving puzzles, taking notes, storing found objects, altering the virtual space in any way, causing system 10 to replay a particular portion of virtual reality content, causing system 10 to rewind the virtual reality content to a particular point in time, and/or other interaction. In short, any control of the virtual space, communication with characters in the virtual space, creation and/or customization of objects in the virtual space, movement within the virtual space (e.g., moving to and/or through any particular portion and/or view of the virtual space such as flying through a cave and then looking back), a change of virtual environment altogether, an interaction and/or movement that has a dynamic active and/or passive effect on the virtual space and/or characters within the virtual space, collaborative projects (e.g., collaborative story experiences and/or future forward interactive (including collaborative) story editing and/or creating experiences), and/or other interaction may be facilitated by interaction component 28.

In some implementations, interaction component 28 may be configured to adjust the primary virtual reality content presented to the user based on interaction between the user and the secondary, tertiary, etc., virtual reality content, and/or based on other information. For example, the storyline of a primary virtual reality content narrative (e.g., a movie) may be adjusted based on interaction between the user and secondary virtual reality content. In some implementations, interaction component 28 may be configured to adjust the secondary, tertiary, etc., virtual reality content presented to the user based on interaction between the user and the primary virtual reality content, a progression of the user through the primary virtual reality content (e.g., progression through a movie watched by the user, a video game played by the user, etc.), and/or other information. In some implementations, adjustments may be serialized across stories so that, for example, if a user watches the villain character's (and/or any other character's) backstory in one story (which may be identified because the user kept looking at the villain and interacted with the villain in the secondary space), a corresponding sequel to the story may incorporate this information and adjust the content of the sequel accordingly.

By way of a non-limiting example, the secondary, tertiary, etc., virtual reality content may be determined by system 10 based on the user's progression through a movie (e.g., as characters are introduced in the movie they may be added to the secondary, tertiary, etc., virtual reality content), based on a user's interaction with the movie (e.g., a user may repeatedly look over to a particular character in the movie which the user is then able to interact with as secondary, tertiary, etc., virtual reality content), and/or based on other information. The user may interact with the secondary, tertiary, etc., virtual reality content (e.g., socialize with a movie character) and then return his view back to the movie wherein the movie has been adjusted by interaction component 28 to reflect the user's interaction with the secondary, tertiary, etc., virtual reality content movie character.

By way of a second non-limiting example, the secondary, tertiary, etc., virtual reality content may be determined by system 10 based on the user's progression through a video game (e.g., a setting for the secondary, tertiary, etc., virtual reality content may be the same as the setting of a primary virtual reality content video game the user is participating in, etc.), based on a user's interaction with the video game (e.g., a user may only use a specific weapon in a video game), and/or based on other information. The user may interact with the secondary, tertiary, etc., virtual reality content (e.g., redesign the weapon) and then return his view back to the video game wherein the weapon has been adjusted by interaction component 28 to reflect the user's interaction with the secondary, tertiary, etc., virtual reality content.

By way of a third non-limiting example, the primary virtual reality content may be a movie and the secondary, tertiary, etc., content may be a video game and/or mini-game that takes place on an expanded set of the primary virtual reality content movie. The expanded set of the video game and/or mini-game may change over time as the user progresses through the primary virtual reality content movie, for example. Or, vice versa, where, as the user progresses through the video game and/or mini game, changes to the primary virtual reality content movie are made that reflect progress through the game. Other non-limiting examples are contemplated.

Figure 4B:
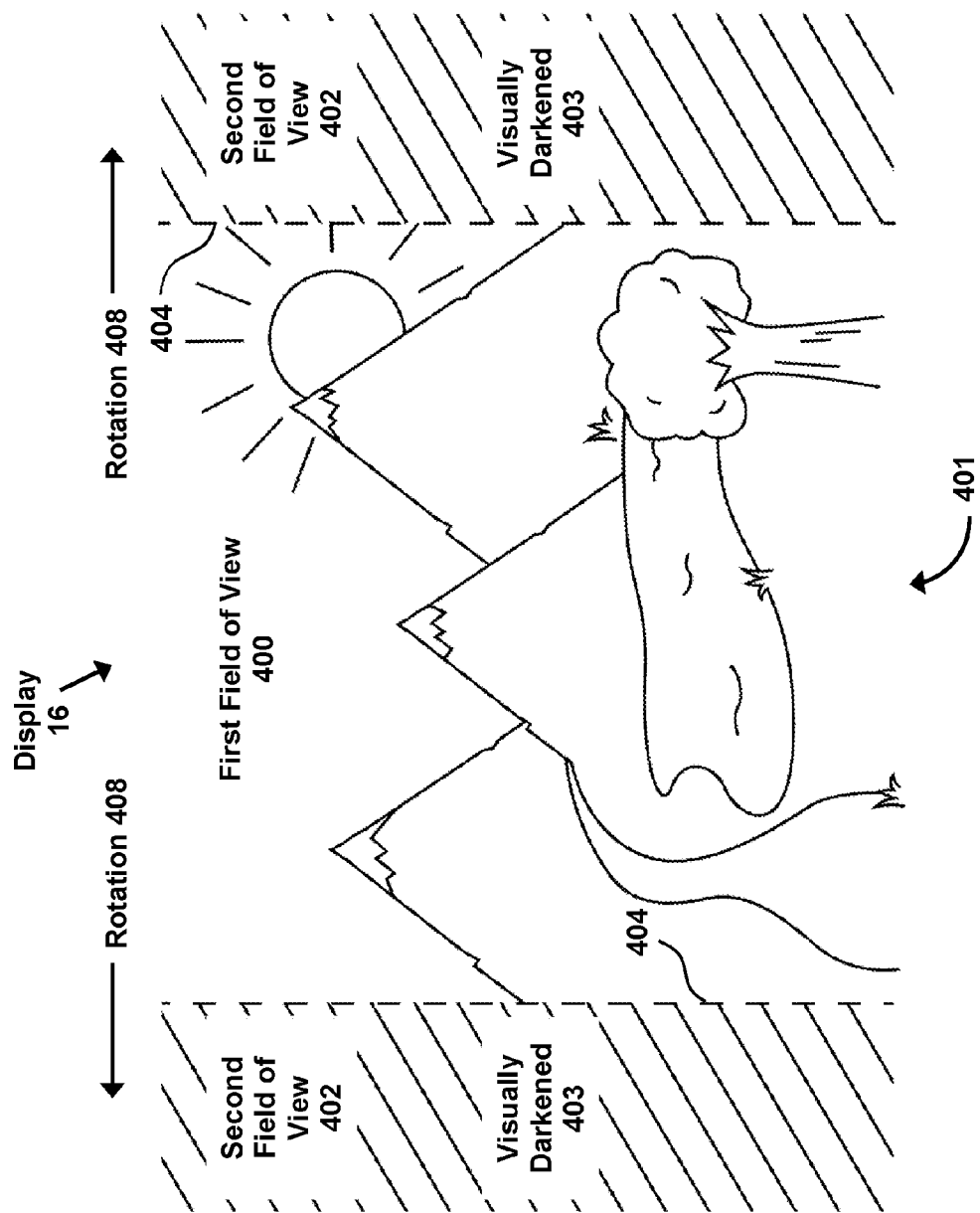
FIG. 4B illustrates a first example of a view of virtual reality content presented to a user on a display.
Figure 4C:
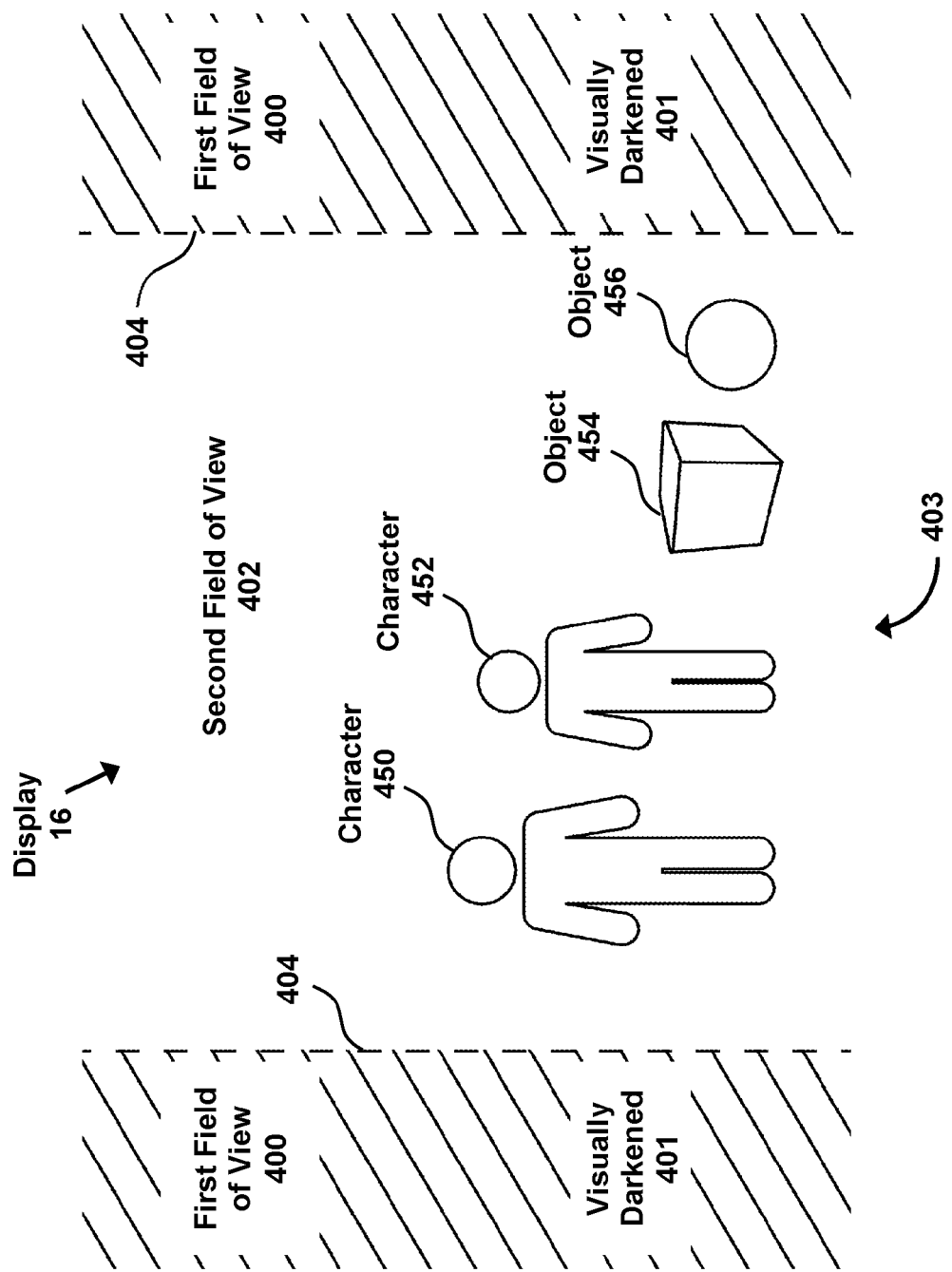
FIG. 4C illustrates a second example of a view of virtual reality content presented to a user on a display.

FIGS. 4B and 4C illustrate examples of views of virtual reality content presented to a user on display 16. In these examples, display 16 may be included in a virtual reality headset (e.g., shown in FIG. 2), and/or other computing devices 12. In FIG. 4B, system 10 (e.g., direction component 22 shown in FIG. 1) has determined that the user's gaze (view direction) is directed toward/into first field of view 400. As such, primary virtual reality content 401 is illuminated while secondary virtual reality content 403 in second field of view 402 is visually darkened. First field of view 400 may be separated from second field of view 402 by field boundary 404. Field boundary 404 may be visible, partially visible, and/or invisible to a user. For example, system 10 (e.g., display component 26 shown in FIG. 1) may be configured to display a visible dotted line (and/or any other type of indication) to the user. System 10 may be configured to display a gradual transition between bright primary virtual reality content 401 and darkened secondary virtual reality content 403. System 10 may be configured to display brightened primary virtual reality content 401 with an abrupt transition to darkened secondary virtual reality content 403. As described above, system 10 may be configured such that a user may rotate 408 his head (change his view direction) from first field of view 400 to second field of view 402. (This example is not intended to be limiting. Other types of visual gradients are contemplated.)

In FIG. 4C, system 10 has determined that the user has turned his head and his gaze (view direction) is directed toward second field of view 402. As such, secondary virtual reality content 403 (e.g., character 450, character 452, object 454, object 456) is illuminated while primary virtual reality content 401 in first field of view 400 is visually darkened. In this example, characters 450, 452 and/or objects 454, 456 may be determined based on the user's interaction with primary virtual reality content 401, a user's progression through primary virtual reality content 401, and/or other information. Primary virtual reality content 401 may be adjusted based on the user's interaction with secondary virtual reality content 403 so that when the user looks back to first field of view 400, primary virtual reality content 401 reflects the interaction with secondary virtual reality content 403.

Figure 4D:
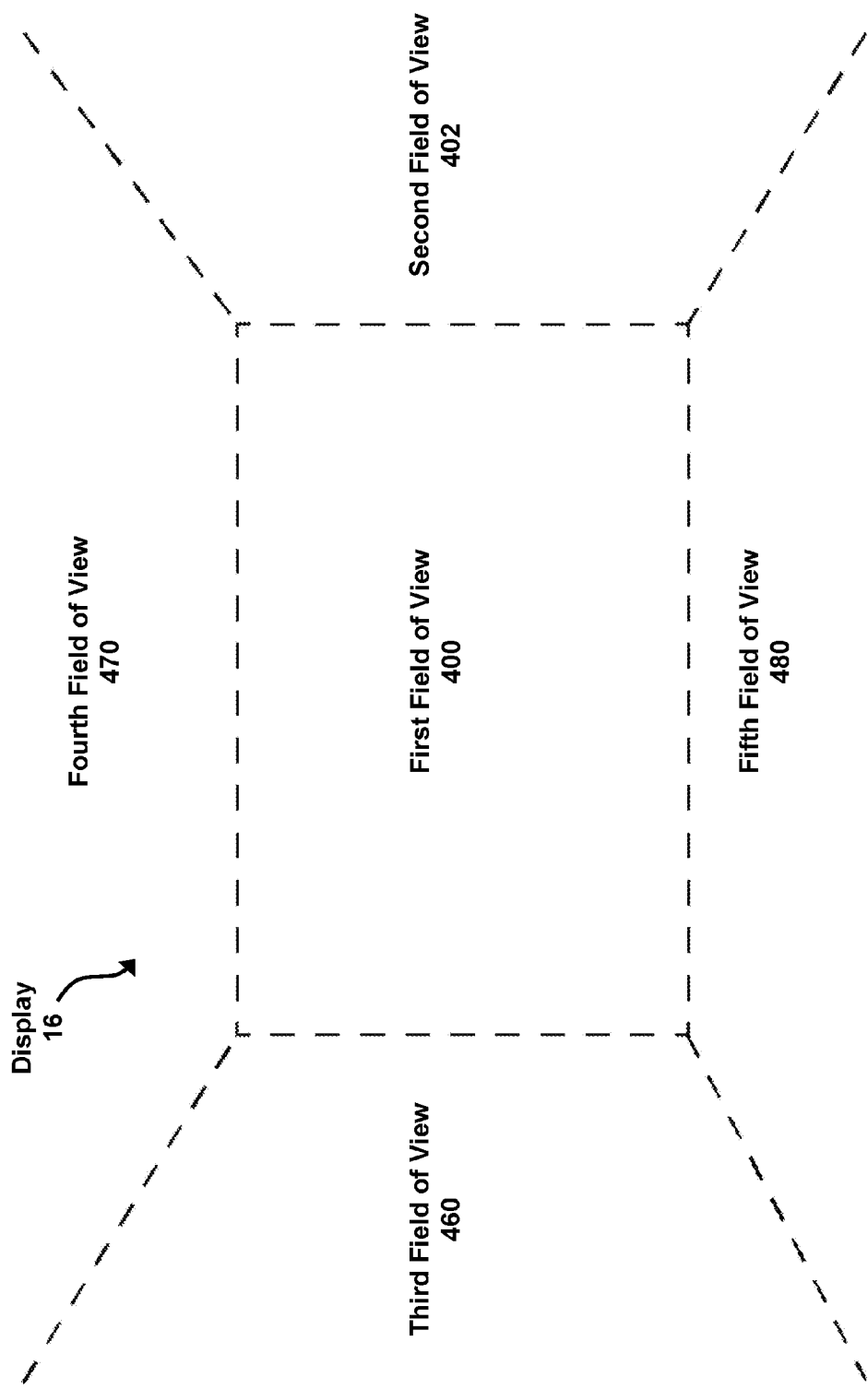
FIG. 4D illustrates multiple fields of view that a user may look toward and/or into.

System 10 is not limited to two fields of view and/or left/right view direction changes as shown in FIGS. 4B and 4C. System 10 may include any number of fields of view in any number of directions. FIG. 4D illustrates multiple fields of view 400, 402, 460, 470, 480 that a user may look toward and/or into. In some implementations, an individual field of view may include, for example, a pop up indicator of an incoming chat that the user could turn and look to, pausing (or not) the primary, secondary, tertiary, etc., content. In some implementations, an individual field of view may include a web browser. For example, a user may want to shop (as indicated by turning his head toward the web browser) for clothing worn by a primary, secondary, tertiary, etc., virtual reality content character. System 10 may pause (or not) the primary, secondary, tertiary, etc., virtual reality content and allow the user to buy the clothes, for example.

In some implementations, as described herein, processor 20 (FIG. 1) may be configured such that the view direction of the user may refer to a direction toward which the user's gaze is directed, an orientation of the user's gaze (e.g., the user may tilt his head and/or lean over), a position of the user within the virtual space, and/or other directional and/or positional information (e.g., a user may move his position in the virtual space across a boundary). Direction component 22 (FIG. 1) of processor 20 may be configured such that the user may lean into another field of view, walk into another field of view, move (e.g., run, drive, fly, etc.) into another field of view, and/or otherwise move himself across a view boundary into an adjacent field of view. In some implementations, processor 20 may be configured such that different virtual reality content is displayed to the user in the individual fields of view. In some implementations, the boundaries of the fields of view, the virtual reality content displayed to the user in the fields of view, and other characteristics of system 10 may be created, customized, and/or adjusted by the user.

Returning to FIG. 1, in some implementations, interaction component 28 may be configured to facilitate the creation, customization, and/or adjustment of the fields of view, the view boundaries, the virtual reality content (e.g., primary, secondary, tertiary, etc.), and/or other characteristics of system 10. Facilitating creation, customization, and/or adjustment of the fields of view, the view boundaries, and/or the other characteristics of system 10 may include creating fields of view and/or view boundaries, adjusting a number of individual fields of view, adjusting a shape and/or sized of individual fields of view, adjusting a position and/or orientation of an individual field of view relative to other fields of view, adjusting a location of a field boundary, adjusting a camera angle and/or position for displaying virtual reality content in a field of view, and/or other creation, customization, and/or adjustment of fields of view, view boundaries, and/or other components of system 10. For example, one or more boundaries may be positioned relative to a user's location in the virtual space, positioned relative to content in the virtual space, positioned and/or defined by the content creator, and/or positioned and/or defined in other ways. In some implementations, the boundaries may move relative to a movement of a user, may move as directed by a content creator, and/or may move in other ways.

Facilitating creation, customization, and/or adjustment of the virtual reality content and/or other characteristics of system 10 may include creating virtual reality content (e.g., characters, objects, a scene, etc.); customizing and/or adjusting an appearance of virtual reality content; customizing and/or adjusting actions performed by virtual reality content, coupling virtual reality content with one or more specific fields of view; creating, adjusting, and/or customizing relationships between primary virtual reality content and secondary, tertiary, etc., virtual reality content (e.g., specifying which characters from a movie should appear as secondary, tertiary, etc., virtual reality content at various time points throughout a movie); specifying the type of sensory cue(s) used to indicate to a user that his view direction has moved across a view boundary, specifying an intensity level of the sensory cue(s) (e.g., a brightness/darkness level for the virtual reality content) so that the sensory cue is adjusted to the user's liking, and/or other creation, customization, and/ or adjustment of virtual reality content and/or other components of system 10. In some implementations, interaction component 28 may be configured such that a user may create, customize, and/or adjust within previously determined parameters for creating, customizing, and/or adjusting (e.g., the previously determined parameters determined by a content creator at manufacture/during software creation).

Facilitating creation, customization, and/or adjustment of the virtual reality content and/or other characteristics of system 10 may include facilitating a user's ability to "film" a scene, recut a scene, re-block a scene, change the animation in a scene, change the dialogue in a scene, change voices of characters, change the look of a scene and/or characters in a scene and/or other creation, customization, and/or adjustment. In some implementations, facilitating creation, customization, and/or adjustment of the virtual reality content and/or other characteristics of system 10 may include facilitating a user's ability to take content made available by a content creator (e.g., at manufacture, during software creation, etc.) and make viewable user created and/or customized experiences (e.g., machinima and/or other types of rendered stories) with it in the virtual space and then export it for sharing. In some implementations, interaction component 28 may be configured such that a user may live mix, customize, manipulate, and/or edit a story while other users are watching (e.g., editing with an audience) and/or participating in the mixing and/or editing, which then may or may not be replayable and/or savable. This may include collaborative film, collaborative storytelling, collaborative viewing, and/or other collaborative projects such as (for example) experiences where users work and/or observe on a virtual (and/or real) production set together on any or all aspects of the process of creating stories (such as but not limited to importing assets, art direction, scene construction and modification, direction, cinematography, editing, acting, scoring, exporting, sharing, etc.)

Interaction component 28 may be configured to facilitate the creation, customization, and/or adjustment via user interface 14 and/or other components of system 10. Interaction component 28 may cause user interface 14 to present one or more views of a graphical user interface to the user to facilitate the creation, customization, and/or adjustment. The one or more views may include one or more fields and/or overlays (e.g., the customization views may appear as separate field and/or as overlays on a particular field and/or in a particular scene in the virtual space) for creating, customizing, and/or adjusting the fields of view, the view boundaries, the virtual reality content, and/or other characteristics of system 10. The one or more views may include one or more fields and/or overlays for previewing changes to system 10 before implementation. The one or more views may include one or more fields and/or overlays such as 3D menus, sliders, settings, and/or other objects represented as 3D objects in the virtual space, and/or other fields and/or overlays.

Figure 5:
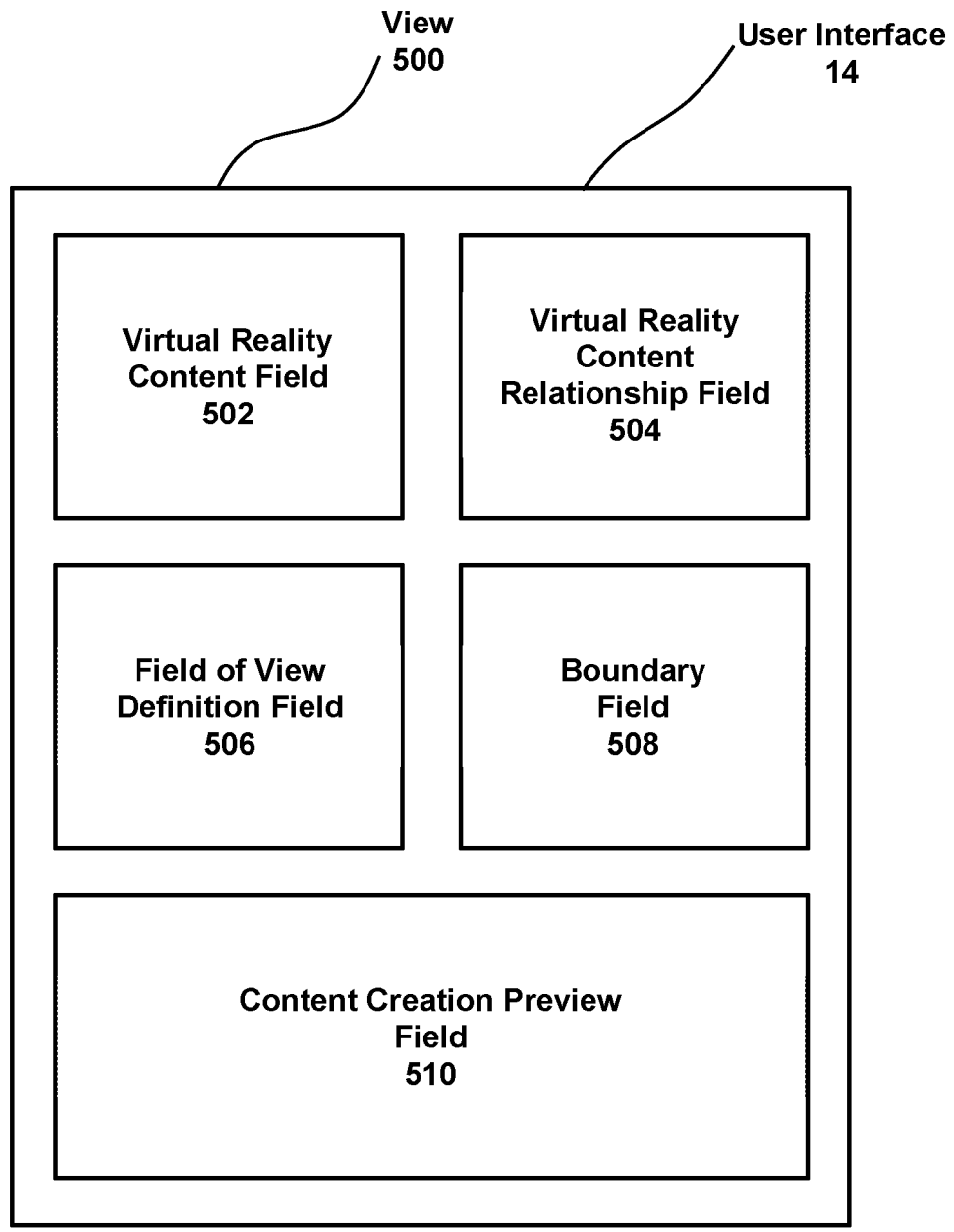
FIG. 5 illustrates an example of a possible view of a content creation graphical user interface.

FIG. 5 illustrates an example of a possible view 500 of a graphical user interface presented to a user via user interface 14 to facilitate creation, customization, and/or adjustment of the fields of view, the view boundaries, the virtual reality content, and/or other characteristics of system 10. View 500 includes a virtual reality content field 502, a virtual reality content relationship field 504, a field of view definition field 506, a boundary field 508, and a content creation preview field 510.

In some implementations, view 500 and/or other views may be presented to a user, a content creator, and/or other people on a two dimensional display screen. In some implementations, view 500 and/or other views may be presented to a user, a content creator, and/or other people within the virtual space (e.g., in three dimensions) and/or in any other form. A user, content creator, and/or other persons may create, customize, and/or adjust using a controller (e.g., a pointer) of user interface 14, physical body movements, gestures, and/or other motions to control the fields and/or virtual reality content within the fields (e.g., via a controller of interface 14), and/or other methods of control. For example, in implementations in which view 500 is presented to the user and/or the content creator in the virtual space (e.g., in three dimensions), the various fields may be positioned around the user and/or content creator. The user may virtually reach out and grab and/or move the fields and/or objects in the fields to make changes as described herein.

Virtual reality content field 502 may facilitate creation of virtual reality content, customizing and/or adjusting an appearance of virtual reality content; customizing and/or adjusting actions performed by virtual reality content, and/or other creating, customizing, and/or adjustment actions. Virtual reality content relationship field 504 may facilitate coupling virtual reality content with one or more specific fields of view; creating, adjusting, and/or customizing relationships between primary virtual reality content and secondary, tertiary, etc., virtual reality content; specifying the type of sensory cue(s) used to indicate to a user that his view direction has moved across a view boundary, specifying an intensity level of the sensory cue(s) (e.g., a brightness/ darkness level for the virtual reality content), and/or other creation, customization, and/or adjustment actions.

Field of view definition field 506 and/or boundary field 508 may facilitate creating fields of view and/or view boundaries, adjusting a number of individual fields of view, adjusting a shape and/or size of individual fields of view, adjusting a position and/or orientation of an individual field of view relative to other fields of view, adjusting a location of a field boundary, widening and/or narrowing a field of view, adjusting a brightness level of a darkened environment and or a darkened (e.g., secondary virtual reality content) field of view, adjusting a depth of field, changing a degree of darkness fall off/gradient control, changing a degree and/or style of blending between worlds on opposite sides of a boundary, and/or other creation, customization, and/or adjustment of fields of view, view boundaries, and/or other characteristics of system 10.

In some implementations, field of view definition field 506 may be configured to facilitate (e.g., as directed by processor 20) a calibration operation that determines boundaries of one or more fields of view for a user. The calibration operation may direct the user to make one or more movements and provide feedback on a physical comfort level relative to the movements (e.g., via user interface 14 shown in FIG. 1). The user's movements may be tracked by direction component 22 (FIG. 1) via directional sensors, cameras, eye tracking devices, user telemetry devices, user dimension determining devices etc., sensors 18, and/or other devices, and field of view definition field 506 may determine one or more fields of view based on the user's movements, the user's feedback, and/or other information. In some implementations, the calibration operation may be done entirely visually, and/or based off of eye analysis from an eye tracking device, and/or from input that conveys a vision type derived from another computer test (e.g., possibly at an optometrist and/or using optometry tools). Such a calibration operation may be based on a user's interpupilary distance, for example.

Content creation preview field 510 may be configured to present a user with a preview of system 10 that simulates the created, customized, and/or adjusted (e.g., via fields 502- 510) characteristics of system 10. Interaction component 28 (FIG. 1) may be configured such that a user may, after viewing a preview in content creation preview field 510, continue to make changes, and/or implement the changes via information entered and/or selected via field 510.

FIG. 5 is not intended to be limiting. In some implementations, system 10 may be configured such that views of a graphical user interface presented to a user to facilitate creation, customization, and/or adjustment may be presented to the user in three dimensions (e.g., via three dimensional display devices described herein). Such views may include fields that facilitate creation, customization, and/or adjustment in two and/or three dimensions. For example, system 10 may be configured such that boundaries may be manipulated using hand gestures (e.g., squashing and/or stretching a boundary, eliminating a boundary by making a throwing motion). System 10 may be configured such that a visual quality of a dotted line (for example) dividing fields of view may be manipulated (e.g., a dotted line or a solid line, a glow/transparency of the boundary line). System 10 may be configured such that a controller (e.g. part of user interface 14), a body tracking system (e.g., a system configured for positional tracking of the body such as hand tracking, arm tracking, leg tracking, etc. which may be a camera based MOCAP system and/or a system that does not require a camera), and/or other devices may be used to create and/or manipulate a boundary. System 10 may be configured to track a user's movement (e.g., walking around, leaning in, etc.) and create a boundary based on the user's movement.

Returning to FIG. 1, electronic storage 30 may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store files, software algorithms, information determined by processor(s) 20, and/or other information that enables the respective devices to function as described herein.

Figure 6:
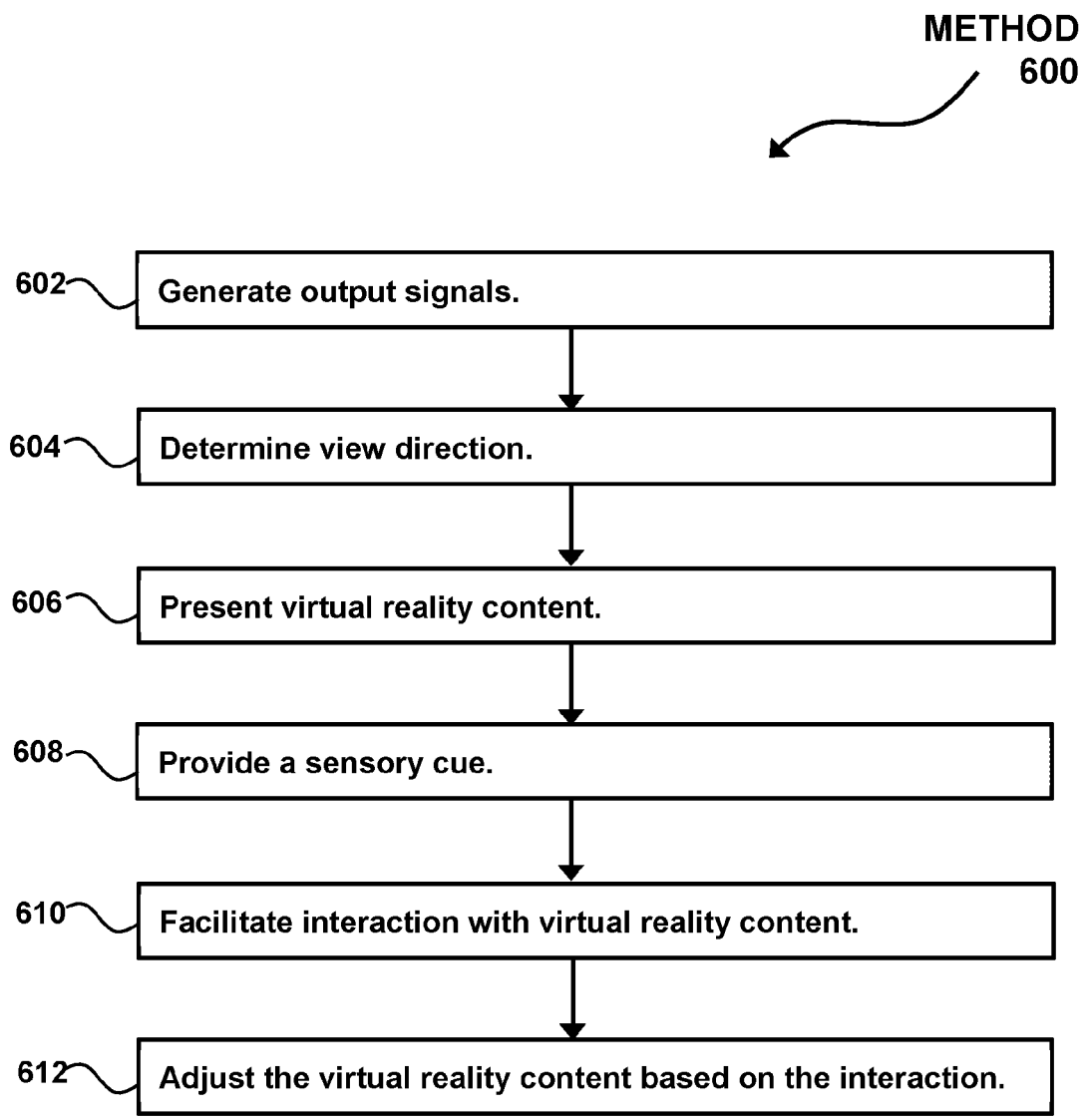
FIG. 6 illustrates an implementation of a method for presenting virtual reality content to a user.

FIG. 6 illustrates an implementation of a method 600 for presenting virtual reality content to a user. The operations of method 600 presented below are intended to be illustrative. In some implementations, method 600 may be accomplished with one or more additional operations not described, and/or without one or more of the operations discussed. Additionally, the order in which the operations of method 600 are respectively illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, output signals may be generated. The output signals may convey information related to a view direction of the user, and/or other information. The view direction of the user may correspond to a physical direction toward which a gaze of the user is directed. For example, the view direction may include a first view direction that corresponds to a first physical direction toward which the gaze of the user is directed (e.g., the user may be looking in a forward direction) and a second view direction that corresponds to a second physical direction toward which the gaze of the user is directed (e.g., the user may turn around and look in a reverse direction). In some implementations, operation 602 may be performed by one or more sensors that are the same as or similar to sensors 18 (shown in FIG. 1 and described herein).

At an operation 604, a view direction of the user may be determined. The view direction of the user may be determined based on the output signals and/or other information. In some implementations, operation 604 may be performed by a computer processor component that is the same as or similar to direction component 22 (shown in FIG. 1 and described herein).

At an operation 606, the virtual reality content may be presented to the user. The virtual reality content may be presented to the user such that the presented virtual reality content corresponds to the determined view direction of the user. The virtual reality content may include primary virtual reality content that is presented to the user within a first field of view, secondary virtual reality content that is presented to the user within a second field of view, tertiary virtual reality content, etc., and/or other virtual reality content that is presented to the user within other fields of view. For example, the primary virtual reality content may be a movie (e.g., a three dimensional movie) and the secondary, tertiary, etc., virtual reality content may be content associated with the movie (e.g., characters from the movie, objects seen in the movie, music and/or a soundtrack from the movie, a game associated with the movie, etc.). The virtual reality content (e.g., the primary, secondary, tertiary, etc., virtual reality content, information that describes the virtual space itself) for display to the user may be obtained from electronic storage, via external resources not included in system 10 (e.g., a server), and/or from other sources.

In some implementations, presenting may include causing a display to present the virtual reality content. In some implementations, the display may be included in a virtual reality headset worn by the user. The display may be caused to display the virtual reality content based on the determined view direction such that the primary virtual reality content is presented to the user responsive to the view direction of the user being within the first field of view (looking forward for example) and the secondary, tertiary, etc., virtual reality content is presented to the user responsive to the view direction of the user being within the second field of view (looking in the reverse direction for example). In some implementations, the first field of view and the second field of view may share a field boundary (this also applies to a third, fourth, fifth, field of view, etc.). In some implementations, the display may be caused to pause the presentation of the primary virtual reality content responsive to the view direction of the user changing from the first field of view to the second (and/or third, fourth, fifth, etc.) field of view. Operation 606 may be performed by computer processor components and a display that are the same as or similar to content component 24, display component 26, and/or display 16 (shown in FIG. 1 and described herein).

At an operation 608, one or more sensory cues may be provided to the user. Providing one or more sensory cues to the user may include determining (e.g., performing a calculation) whether the view direction of the user has changed from one field of view to another. The sensory cues may be provided to the user responsive to the view direction of the user changing between the first field of view and the second field of view (and/or other fields of view, for example). The sensory cues may include visual, auditory, tactile, olfactory, and/or other sensory cues. In some implementations, the sensory cue may comprise a visually perceptible darkening of the primary virtual reality content and a brightening of the secondary, tertiary, etc., virtual reality content, and/or other cues. In some implementations, one or more cues may be provided to the user responsive to the view direction of the user moving across the field boundary. In some implementations, operation 608 may be performed by a computer processor component that is the same as or similar to display component 26 (shown in FIG. 1 and described herein).

At an operation 610, interaction between the user and the virtual reality content may be facilitated. Facilitating interaction between the user and the virtual reality content may include facilitating interaction between the user and the primary virtual reality content, and/or facilitating interaction between the user and the secondary, tertiary, etc., virtual reality content. Operation 610 may be performed by a computer processor component the same as or similar to interaction component 28 (shown in FIG. 1 and described herein).

At an operation 612, the virtual reality content displayed to the user may be adjusted based on the interaction between the user and the virtual reality content. For example, the primary virtual reality content may be adjusted based on interaction between the user and the secondary, tertiary, etc., virtual reality content. The secondary, tertiary, etc., virtual reality content may be adjusted based on interaction between the user and the primary virtual reality content, a progression of the user through the primary virtual reality content, and/or other information. Operation 612 may be performed by a computer processor component the same as or similar to interaction component 28 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. As another example, the present disclosure contemplates that technological advances in display technology such as light field imaging on the back of a retina, contact lens displays, and/or a display configured to communicate with (e.g., transmit signals to and/or receive signal's from) a user's brain fall within the scope of this disclosure.

What is claimed is:

1. A system for presenting virtual reality content to a user in a virtual space, the system comprising:
   one or more sensors that generate output signals conveying information related to a physical position of the user in physical space, the physical position including a first physical position and a second physical position of the user in physical space;
   a display that presents the virtual reality content to the user, wherein presentation of the virtual reality content via the display visually simulates presence of the user within a virtual space, the virtual space being fixed relative to physical space such that the physical position and/or view direction of the user dictates which portions of the virtual space are visible to the user, the virtual reality content comprising primary virtual reality content that is presented to the user within a first spatial field, and secondary virtual reality content that is presented to the user within a second spatial field, wherein the first spatial field is fixed spatially within the virtual space so that the position of the first spatial field in the virtual space is independent of the physical position of the user in physical space, and the second spatial field is fixed spatially within the virtual space so that the position of the second spatial field in the virtual space is independent of the physical position of the user in physical space such that the first spatial field and the second spatial field are part of the same virtual space and share a field boundary that is fixed within the virtual space and independent of the physical position of the user in physical space; and one or more physical computer processors configured by computer readable instructions to:

determine the physical position of the user based on the output signals;

cause the display to present the virtual reality content to the user based on the determined physical position such that:

a virtual position of the user in the virtual space corresponds to the physical position of the user in physical space;

the primary virtual reality content is presented to the user responsive to the virtual position of the user being within the first spatial field and the secondary virtual reality content is presented to the user responsive to the virtual position of the user being within the second spatial field; and the virtual position of the user moves from being within the first spatial field to being within the second spatial field responsive to the user physically moving from the first physical position to the second physical position; and cause the display to provide a sensory cue to the user responsive to the virtual position of the user moving across the field boundary between the first spatial field and the second spatial field.

2. The system of claim 1, wherein the one or more physical computer processors are configured such that the virtual position of the user moves from being within the first spatial field to being within the second spatial field responsive to the user physically walking from the first physical position to the second physical position.

3. The system of claim 1, wherein the one or more physical computer processors are configured such that the virtual position of the user moves from being within the first spatial field to being within the second spatial field responsive to the user physically bending and/or leaning over from the first physical position to the second physical position.

4. The system of claim 1, wherein the one or more physical computer processors are configured such that the virtual position of the user moves from being within the first spatial field to being within the second spatial field responsive to one or more of the user physically moving from a sitting position to a standing position, the user jogging from the first physical position to the second physical position, the user running from the first physical position to the second physical position, the user driving from the first physical position to the second physical position, the user jumping from the first physical position to the second physical position, or the user flying from the first physical position to the second physical position.

5. The system of claim 1, wherein the one or more physical computer processors are further configured to cause the display to pause the presentation of the primary virtual reality content responsive to the virtual position of the user changing from the first spatial field to the second spatial field.

6. The system of claim 1, wherein the one or more physical computer processors are further configured to facilitate:

interaction between the user and the primary virtual reality content; and interaction between the user and the secondary virtual reality content.

7. The system of claim 6, wherein the one or more physical computer processors are further configured to adjust the primary virtual reality content presented to the user based on interaction between the user and the secondary virtual reality content.

8. The system of claim 6, wherein the one or more physical computer processors are further configured to adjust the secondary virtual reality content presented to the user based on one or more of interaction between the user and the primary virtual reality content, or a progression of the user through the primary virtual reality content.

9. The system of claim 1, wherein the one or more physical computer processors are configured such that the sensory cue comprises a visually perceptible darkening of the primary virtual reality content and a brightening of the secondary virtual reality content.

10. The system of claim 1, wherein the display is included in a virtual reality headset worn by the user.

11. The system of claim 10, wherein the one or more physical computer processors are configured to cause the display to stop presenting the virtual reality content to the user responsive to the user removing the headset from his head and/or resume presenting the virtual reality content responsive to the user replacing the headset on his head.

12. The system of claim 1, wherein the one or more physical computer processors are configured such that the primary virtual reality content is a movie.

13. The system of claim 12, wherein the one or more physical computer processors are configured such that the secondary virtual reality content is associated with the movie.

14. A method for presenting virtual reality content to a user, the method comprising:

generating output signals conveying information related to a physical position of the user in physical space, the physical position including a first physical position and a second physical position of the user in physical space determining the physical position of the user based on the output signals;

presenting the virtual reality content to the user via a display, wherein presentation of the virtual reality content via the display visually simulates presence of the user within a virtual space, the virtual space being fixed relative to physical space such that the physical position and/or view direction of the user dictates which portions of the virtual space are visible to the user, the virtual reality content comprising primary virtual reality content that is presented to the user within a first spatial field, and secondary virtual reality content that is presented to the user within a second spatial field, wherein the first spatial field is fixed spatially within the virtual space so that the position of the first spatial field in the virtual space is independent of the physical position of the user in physical space, and the second spatial field is fixed spatially within the virtual space so that the position of the second spatial field in the virtual space is independent of the physical position of the user in physical space such that the first spatial field and the second spatial field are part of the same virtual space and share a field boundary that is fixed within the virtual space and independent of the physical position of the user in physical space, wherein the virtual reality content is presented to the users based on the determined physical position such that:

a virtual position of the user in the virtual space corresponds to the physical position of the user in physical space;

the primary virtual reality content is presented to the user responsive to the virtual position of the user being within the first spatial field and the secondary virtual reality content is presented to the user responsive to the virtual position of the user being within the second spatial field; and the virtual position of the user moves from being within the first spatial field to being within the second spatial field responsive to the user physically moving from the first physical position to the second physical position; and causing a display to provide a sensory cue to the user responsive to the virtual position of the user moving across the field boundary between the first spatial field and the second spatial field.

15. The method of claim 14, wherein the virtual position of the user moves from being within the first spatial field to being within the second spatial field responsive to the user physically walking from the first physical position to the second physical position.

16. The method of claim 14, wherein the virtual position of the user moves from being within the first spatial field to being within the second spatial field responsive to the user physically bending and/or leaning over from the first physical position to the second physical position.

17. The method of claim 14, wherein the virtual position of the user moves from being within the first spatial field to being within the second spatial field responsive to one or more of the user physically moving from a sitting position to a standing position, the user jogging from the first physical position to the second physical position, the user running from the first physical position to the second physical position, the user driving from the first physical position to the second physical position, the user jumping from the first physical position to the second physical position, or the user flying from the first physical position to the second physical position.

18. The method of claim 14, further comprising causing the display to pause the presentation of the primary virtual reality content responsive to the virtual position of the user changing from the first spatial field to the second spatial field.

19. The method of claim 14, further comprising facilitating:

interaction between the user and the primary virtual reality content; and interaction between the user and the secondary virtual reality content.

20. The method of claim 19, further comprising adjusting the primary virtual reality content presented to the user based on interaction between the user and the secondary virtual reality content.

21. The method of claim 19, further comprising adjusting the secondary virtual reality content presented to the user based on one or more of interaction between the user and the primary virtual reality content, or a progression of the user through the primary virtual reality content.

22. The method of claim 14, wherein the sensory cue comprises a visually perceptible darkening of the primary virtual reality content and a brightening of the secondary virtual reality content.

23. The method of claim 14, wherein the display is included in a virtual reality headset worn by the user.

24. The method of claim 23, further comprising causing the display to stop presenting the virtual reality content to the user responsive to the user removing the headset from his head and/or resume presenting the virtual reality content responsive to the user replacing the headset on his head.

25. The method of claim 14, wherein the one or more physical computer processors are configured such that the primary virtual reality content is a movie.

26. The method of claim 14, wherein the one or more physical computer processors are configured such that the secondary virtual reality content is associated with the movie.

* * * * *